United States Patent
Shimoda et al.

(10) Patent No.: US 6,728,181 B2
(45) Date of Patent: Apr. 27, 2004

(54) CODE JUDGING APPARATUS AND METHOD, RECORD MEDIUM JUDGING APPARATUS AND METHOD, AND INFORMATION RECORDING APPARATUS AND METHOD

(75) Inventors: Yoshitaka Shimoda, Tokorozawa (JP); Masayoshi Yoshida, Tokorozawa (JP); Tsuyoshi Hasebe, Tokorozawa (JP); Tetsuaki Kawahara, Tokorozawa (JP)

(73) Assignee: Pioneer Corporation, Tokyo-To (JP)

( * ) Notice: Subject to any disclaimer, the term of this patent is extended or adjusted under 35 U.S.C. 154(b) by 470 days.

(21) Appl. No.: 09/749,177

(22) Filed: Dec. 28, 2000

(65) Prior Publication Data

US 2001/0006575 A1 Jul. 5, 2001

(30) Foreign Application Priority Data

Dec. 28, 1999 (JP) .......................................... P11-374266

(51) Int. Cl.[7] .................................................. G11B 7/00
(52) U.S. Cl. .................................... 369/53.2; 369/53.22
(58) Field of Search ............................ 369/53.2, 53.21, 369/53.22, 53.23, 59.23, 94, 84, 83, 47.54, 47.22, 30.05, 275.3, 275.2

(56) References Cited

U.S. PATENT DOCUMENTS

| | | | |
|---|---|---|---|
| 4,958,314 A | | 9/1990 | Imai et al. .................. 364/900 |
| 5,764,610 A | * | 6/1998 | Yoshida et al. .......... 369/53.22 |
| 5,818,812 A | | 10/1998 | Moribe et al. ............ 369/275.1 |
| 6,320,840 B1 | * | 11/2001 | Oh et al. ....................... 369/94 |
| 6,597,643 B1 | * | 7/2003 | Mitchell et al. .......... 369/53.23 |

FOREIGN PATENT DOCUMENTS

WO    WO 00/48190    8/2000

\* cited by examiner

*Primary Examiner*—Thang V. Tran
(74) *Attorney, Agent, or Firm*—Morgan, Lewis & Bockius LLP

(57) ABSTRACT

A code judging apparatus is provided with: a detecting device (11) for optically detecting an information code including at least identification information to individually identify a writable record medium (DK), in which record information can be written, from the writable record medium to thereby output an output signal; a moving device (19) for moving the detecting device onto a set area, which is an area on the writable record medium where the information code is supposed to be recorded; and a judging device (19) for judging whether or not the information code is recorded on the writable record medium, in accordance with the output signal outputted from the detecting device moved on the set area.

20 Claims, 9 Drawing Sheets

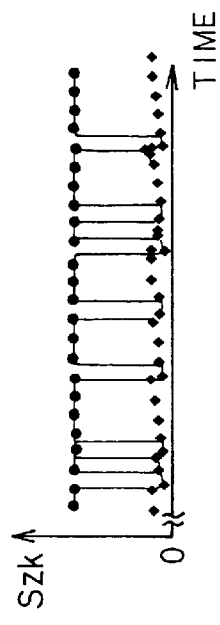
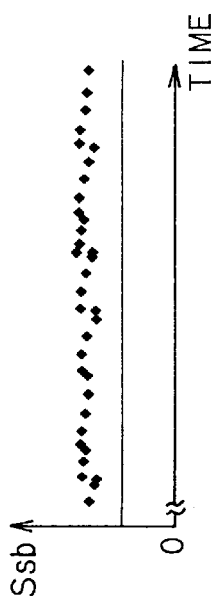
FIG. 9A
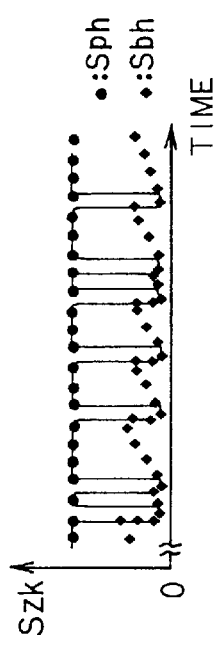
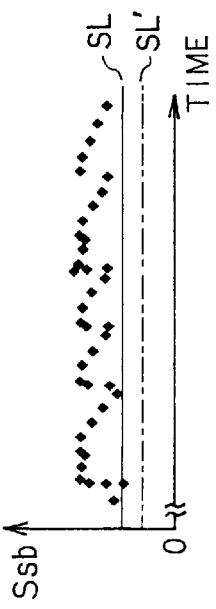
FIG. 9B

CODE JUDGING APPARATUS AND METHOD, RECORD MEDIUM JUDGING APPARATUS AND METHOD, AND INFORMATION RECORDING APPARATUS AND METHOD

BACKGROUND OF THE INVENTION

1. Field of the Invention

The present invention relates to a code judging apparatus and a cord judging method, a record medium judging apparatus and a record medium judging method, and an information recording apparatus and an information recording method. More particularly it relates to a code judging apparatus for and a code judging method of judging a presence or absence of an information code including at least identification information to individually identify a writable record medium. It also relates to a record medium judging apparatus, which includes the code judging apparatus, for judging a type of the writable record medium or the like, and a record medium judging method, which includes the code judging method, of judging a type of the writable record medium or the like. It further relates to an information recording apparatus, which includes the record medium judging apparatus, for recording information onto the writable record medium, and an information recording method, which includes the record medium judging method, of recording information onto the writable record medium and the like.

2. Description of the Related Art

In recent years, a so-called DVD having a record capacity higher by several times than that of a conventional CD (Compact Disc) has been generalized. Moreover, a so-called DVD-RW (DVD-Re-recordable) is manufactured as a DVD, which has a record format substantially equal to that of a DVD-ROM (DVD-Read Only) dedicated to a reading out operation and enables record information to be re-written at a plurality of times.

Here, since the DVD-RW has the record format substantially equal to that of the DVD-ROM as mentioned above, a DVD player for the DVD-ROM, which is being generalized, can reproduce the information recorded thereon. Hence, the DVD-RW is expected to be widely generalized in future as a rewritable DVD having a high universality.

On the other hand, in order to generalize such a rewritable DVD, it may be necessary to protect the record information recorded thereon, from the viewpoint of a copyright.

As an effective method of protecting the record information from the viewpoint of the copyright, a following method may be considered. Namely, identification information for identifying the DVD-RWs one by one from each other, is recorded onto each DVD-RW on which record information is not recorded yet. Then, the identification information is read out in advance when recording the record information onto the DVD-RW. Then the record information is recorded onto the DVD-RW after performing a copyright protection process with respect to the record information, by use of the read out information. According to this method, it is possible to perform the copyright protection process, which is different for each DVD-RW, with respect to the record information prior to the recording. Thus, the record information can be effectively protected, from the viewpoint of the copyright.

On one hand, the protection of the record information from the viewpoint of the copyright is not always necessary for all the record information. There may be a case that the protection from the viewpoint of the copyright is not necessary for a certain kind of record information. In this case, it is not necessary to preliminarily record the identification information on the non-recorded DVD-RW.

Therefore, in case of the DVD-RW currently being manufactured, it is prescribed on a standard that the preliminary recording of the identification information on the non-recorded DVD-RW is not essential but is optional.

On the other hand, in case of preliminarily recording the identification information onto the DVD-RW, a record position may be in one portion of an area where the record information is recorded (hereafter, which is merely referred to as a "data area") together with the record information.

However, if the identification information is recorded in the data area, the original record information and the identification information, which is significantly different from the record information in manner and performance, are mixed in the data area. As a result, this mixture of the record information and the identification information gives a bad influence onto an operation of a so-called tracking servo control system, a so-called focus servo control system or a so-called spindle servo control system. That is, this has a problem that each servo control system may be abnormally operated at a switching position between the record information and the identification information.

Thus, when the identification information is necessary, it is desirable to preliminarily record the identification information in an area different from the data area on the DVD-RW.

When the record information is actually recorded onto the DVD-RW, it is necessary to surely judge a presence or absence of the identification information and then record the record information in accordance with a record manner that is different depending upon the judgment result. That is, if the identification information is recorded on the DVD-RW, the record information is recorded after the above copyright protection process different for each DVD-RW is performed with respect to the record information by using the identification information. On the other hand, if the record information is not recorded on the DVD-RW, the protecting process is not performed, and the record information is recorded as it is.

SUMMARY OF THE INVENTION

The present invention is proposed in view of the above mentioned problem. It is therefore an object of the present invention to provide: a code judging apparatus and a code judging method, which can surely judge a presence or absence of identification information supposed to be recorded in an area other than a data area and can make the judged result reflected to a later recording process; a record medium judging apparatus including the code judging apparatus and a record medium judging method including the code judging method, which can judge a type of a writable record medium such as a DVD-RW and the like (e.g., which can judge whether it is a writable record medium of one type to which the record information is recorded after an execution of a copyright protection process or a writable record medium of another type to which the record information is recorded without the execution of the protecting process); and an information recording apparatus including the record medium judging apparatus and an information recording method including the record medium judging method, which can record the record information onto the writable record medium.

The above object of the present invention can be achieved by a code judging apparatus provided with: a detecting device, such as an optical pickup or the like, for optically detecting an information code including at least identification information to individually identify a writable record medium, such as a DVD-RW or the like, in which record information can be written, from the writable record medium to thereby output an output signal; a moving device, such as a system controller or the like, for moving the detecting device onto a set area, which is an area on the writable record medium where the information code is supposed to be recorded; and a judging device, such as a system controller or the like, for judging whether or not the information code is recorded on the writable record medium, in accordance with the output signal outputted from the detecting device moved on the set area.

According to the code judging apparatus of the present invention, it is judged whether or not the information code is recorded, in accordance with the output signal, which is outputted from the detecting device when it is moved on the set area. Thus, it is possible to reflect the result of the judgment as for whether or not the information code is recorded, to a process or processes after that.

Thus, for example, it is possible to surely carry out the process of recording the record information onto the writable record medium and the like after the execution of the reproduction control process using the different identification information for each writable record medium.

In one aspect of the code judging apparatus of the present invention, the judging device is provided with a binary-coding device for converting the output signal into a binary value and outputting a binary-coded signal, and the judging device judges that the information code is recorded on the writable record medium if an edge interval, which is an interval of a switching timing between binary values of the outputted binary-coded signal, is within a preset range of the edge interval corresponding to only the information code.

According to this aspect, since it is judged whether or not the information code is recorded depending upon whether or not the edge interval of the binary-coded signal is within the preset range of the edge interval corresponding to only the information code, it is possible to surely detect the presence or absence of the information code.

In another aspect of the code judging apparatus of the present invention, the judging device is provided with: a first judging device for judging whether or not an output level of the output signal is changed across a preset standard level; a binary-coding device for converting the output signal into a binary value and outputting a binary-coded signal; and a second judging device for judging whether or not an edge interval, which is an interval of a switching timing between binary values of the outputted binary-coded signal, is within an identification interval range preset so as to include the edge interval of the output signal corresponding to the record information code. The judging device judges that the information code is recorded on the writable record medium if a result judged by the first judging device indicates that the output level is changed across the standard level and if a result judged by the second judging device does not indicate that the edge interval of the output signal corresponding to the information code is within the identification interval range.

According to this aspect, since the presence or absence of the information code is judged in accordance with the edge interval of the binary-coded signal as well as the output level of the output signal, it is possible to surely detect the presence or absence of the information code.

In this aspect, the edge interval of the output signal corresponding to the record information may be within a range, which is equal to or greater than 3 times of a preset standard clock cycle and is equal to or less than 14 times of the standard clock cycle, and the identification interval range may be longer than 2 times of the standard clock cycle and is shorter than 20 times of the standard clock cycle.

By constituting in this manner, it is possible to surely detect the absence or presence of the information code while restraining a harmful influence of a noise or the like.

In another aspect of the code judging apparatus of the present invention, the code judging apparatus is further provided with a decoding device, such as a BCA (Burst Cutting Area) data decoder or the like, for decoding the information code. Even if the judging device judges that the information code is not recorded on the writable record medium, if the information code is decoded by the decoding device, it is judged that the information code is recorded on the writable record medium.

According to this aspect, even if it is erroneously judged by the judging device that the information code is not recorded, if the information code is actually decoded, it is judged that the information code is certainly recorded on the writable record medium. Accordingly, it is possible to prevent the process using the information code, which is to be executed, from being not executed.

The above object of the present invention can be also achieved by a record medium judging apparatus for judging whether a record medium is (i) a writable record medium on which an information code including at least identification information to individually identify the writable record medium is recorded, (ii) a writable record medium on which the information code is not recorded or (iii) a readable record medium on which record information is recorded in a read only manner. The record medium judging apparatus is provided with (a) the above described code judging apparatus of the present invention (including its various aspects), (b) a readable record medium judging device, such as a system controller or the like, for judging whether or not the record medium is the readable record medium, on the basis of the output signal which is obtained by detecting the record information, and (c) a type judging device, such as a system controller or the like, for (i) judging that the record medium is the writable record medium, on which the information code is recorded, if the code judging device judges that the information code is recorded, and (ii) judging that the record medium is the writable record medium, on which the information code is not recorded, if the code judging device judges that the information code is not recorded.

According to the record medium judging apparatus of the present invention, it is judged whether or not the record medium is the readable record medium, in accordance with the output signal, which is obtained by detecting the record information, and also the type of the writable record medium is judged depending upon the presence or absence of the information code. Thus, it is possible to reflect the result of the judgment as for the type of the record medium, to a process or processes after that.

In one aspect of the record medium judging apparatus of the present invention, record control information to control an operation of recording the record information is recorded in advance on the writable record medium by wobbling information track, and the readable record medium judging device judges that the record medium is the readable record medium if the wobbled information track is not detected on the record medium.

According to this aspect, since it is judged whether or not the record medium is the readable record medium depending upon the presence or absence of the wobbled information track, it is possible to surely judge whether or not the record medium is the readable record medium.

In another aspect of the record medium judging apparatus of the present invention, the writable record medium comprises a DVD-RW while the readable record medium comprises a DVD-ROM.

According to this aspect, it is possible to surely judge the record medium mounted or loaded in an information reproducing apparatus or the like, which is capable of reproducing both of the DVD-ROM and the DVD-RW for example, to thereby accurately reproduce those record mediums.

The above object of the present invention can be also achieved by one information recording apparatus provided with (a) the above described code judging apparatus of the present invention (including its various aspects), (b) a processing device, such as a data encoder or the like, for applying a control process, which is to control an operation of reproducing the record information from the writable record medium after recording, with respect to the record information to be recorded onto the writable record medium by using the detected information code, if the information code is recorded on the writable record medium, and (c) a recording device, such as a laser driver or the like, for recording the record information, to which the control process has been applied, onto the writable record medium.

According to this information recording apparatus of the present invention, since the information code is obtained and the record information is recorded onto the writable record medium after applying the control process with respect to the record information, it is possible to record the record information with applying the control process which is different for each writable record medium.

The above object of the present invention can be also achieved by another information recording apparatus provided with (I) the above described record medium judging apparatus of the present invention (including its various aspects) (II) a processing device, such as a data encoder or the like, for applying a control process, which is to control an operation of reproducing the record information from the writable record medium after recording, with respect to the record information to be recorded onto the writable record medium by using the detected information code, if the record medium is the writable record medium on which the information code is recorded, and (III) a recording device, such as a laser driver or the like, for recording the record information, to which the control process has been applied, onto the writable record medium.

According to this information recording apparatus of the present invention, since the information code is obtained from the judged writable record medium and since the record information is recorded onto the writable record medium after applying the control process with respect to the record information, it is possible to judge the type of the writable record medium and record the record information with applying the control process which is different for each writable record medium.

The above object of the present invention can be also achieved by a code judging method provided with: a moving process of moving a detecting device, such as an optical pickup or the like, for optically detecting an information code including at least identification information to individually identify a writable record medium, such as a DVD-RW or the like, in which record information can be written, from the writable record medium to thereby output an output signal, onto a set area, which is an area on the writable record medium where the information code is supposed to be recorded; and a judging process of judging whether or not the information code is recorded on the writable record medium, in accordance with the output signal outputted from the detecting device moved on the set area.

According to the code judging method of the present invention, it is judged whether or not the information code is recorded, in accordance with the output signal, which is outputted from the detecting device when it is moved on the set area. Thus, it is possible to reflect the result of the judgment as for whether or not the information code is recorded, to a process or processes after that.

In one aspect of the code judging method of the present invention, the judging process is provided with a binary-coding process of converting the output signal into a binary value and outputting a binary-coded signal, and the judging process judges that the information code is recorded on the writable record medium if an edge interval, which is an interval of a switching timing between binary values of the outputted binary-coded signal, is within a preset range of the edge interval corresponding to only the information code.

According to this aspect, since it is judged whether or not the information code is recorded depending upon whether or not the edge interval of the binary-coded signal is within the preset range of the edge interval corresponding to only the information code, it is possible to surely detect the presence or absence of the information code.

In another aspect of the code judging method of the present invention, the judging process is provided with: a first judging process of judging whether or not an output level of the output signal is changed across a preset standard level; a binary-coding process of converting the output signal into a binary value and outputting a binary-coded signal; and a second judging process of judging whether or not an edge interval, which is an interval of a switching timing between binary values of the outputted binary-coded signal, is within an identification interval range preset so as to include the edge interval of the output signal corresponding to the record information code. The judging process judges that the information code is recorded on the writable record medium if a result judged by the first judging process indicates that the output level is changed across the standard level and if a result judged by the second judging process does not indicate that the edge interval of the output signal corresponding to the information code is within the identification interval range.

According to this aspect, since the presence or absence of the information code is judged in accordance with the edge interval of the binary-coded signal as well as the output level of the output signal, it is possible to surely detect the presence or absence of the information code.

In this aspect, the edge interval of the output signal corresponding to the record information may be within a range, which is equal to or greater than 3 times of a preset standard clock cycle and is equal to or less than 14 times of the standard clock cycle, and the identification interval range may be longer than 2 times of the standard clock cycle and is shorter than 20 times of the standard clock cycle.

By constituting in this manner, it is possible to surely detect the absence or presence of the information code while restraining a harmful influence of a noise or the like.

In another aspect of the code judging method of the present invention, the code judging method is further provided with a decoding process of decoding the information code. Even if the judging process judges that the information code is not recorded on the writable record medium, if the information code is decoded by the decoding process, it is judged that the information code is recorded on the writable record medium.

According to this aspect, even if it is erroneously judged by the judging device that the information code is not recorded, if the information code is actually decoded, it is judged that the information code is certainly recorded on the writable record medium. Accordingly, it is possible to prevent the process using the information code, which is to be executed, from being not executed.

The above object of the present invention can be also achieved by a record medium judging method of judging whether a record medium is (i) a writable record medium on which an information code including at least identification information to individually identify the writable record medium is recorded, (ii) a writable record medium on which the information code is not recorded or (iii) a readable record medium on which record information is recorded in a read only manner. The record medium judging method is provided with (a) the above described code judging method of the present invention (including its various aspect), (b) a readable record medium judging process of judging whether or not the record medium is the readable record medium, on the basis of the output signal which is obtained by detecting the record information, and (c) a type judging process of (i) judging that the record medium is the writable record medium, on which the information code is recorded, if the code judging process judges that the information code is recorded, and (ii) judging that the record medium is the writable record medium, on which the information code is not recorded, if the code judging process judges that the information code is not recorded.

According to the record medium judging method of the present invention, it is judged whether or not the record medium is the readable record medium, in accordance with the output signal, which is obtained by detecting the record information, and also the type of the writable record medium is judged depending upon the presence or absence of the information code. Thus, it is possible to reflect the result of the judgment as for the type of the record medium, to a process or processes after that.

In one aspect of the record medium judging method of the present invention, record control information to control an operation of recording the record information is recorded in advance on the writable record medium by wobbling information track, and the readable record medium judging process judges that the record medium is the readable record medium if the wobbled information track is not detected on the record medium.

According to this aspect, since it is judged whether or not the record medium is the readable record medium depending upon the presence or absence of the wobbled information track, it is possible to surely judge whether or not the record medium is the readable record medium.

In another aspect of the record medium judging method of the present invention, the writable record medium comprises a DVD-RW while the readable record medium comprises a DVD-ROM.

According to this aspect, it is possible to surely judge the record medium mounted or loaded in an information reproducing apparatus or the like, which is capable of reproducing both of the DVD-ROM and the DVD-RW for example, to thereby accurately reproduce those record mediums.

The above object of the present invention can be also achieved by one information recording method provided with (a) the above described code judging method of the present invention (including its various aspects), (b) a processing process of applying a control process, which is to control an operation of reproducing the record information from the writable record medium after recording, with respect to the record information to be recorded onto the writable record medium by using the detected information code, if the information code is recorded on the writable record medium, and (c) a recording process of recording the record information, to which the control process has been applied, onto the writable record medium.

According to this information recording method of the present invention, since the information code is obtained and the record information is recorded onto the writable record medium after applying the control process with respect to the record information, it is possible to record the record information with applying the control process which is different for each writable record medium.

The above object of the present invention can be also achieved by an information recording method provided with (I) the above described record medium judging method of the present invention (including its various aspects) (II) a processing process of applying a control process, which is to control an operation of reproducing the record information from the writable record medium after recording, with respect to the record information to be recorded onto the writable record medium by using the detected information code, if the record medium is the writable record medium on which the information code is recorded, and (III) a recording process of recording the record information, to which the control process has been applied, onto the writable record medium.

According to this information recording method of the present invention, since the information code is obtained from the judged writable record medium and since the record information is recorded onto the writable record medium after applying the control process with respect to the record information, it is possible to judge the type of the writable record medium and record the record information with applying the control process which is different for each writable record medium.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 9A is a timing chart showing an operation of a first judging circuit in a first modified embodiment of the present invention; and FIG. 9B is a timing chart showing an operation of a first judging circuit in a second modified embodiment of the present invention.

DETAILED DESCRIPTION OF THE PREFERRED EMBODIMENTS

Preferred embodiments of the present invention will be explained below with reference to the drawings. In the following respective embodiments, the present invention is applied to an information recording/reproducing apparatus, which can reproduce the record information recorded on the above-mentioned DVD-ROM as a readable record medium (i.e., a read only type record medium) and also which can record and reproduce the record information onto and from the above-mentioned DVD-RW as a writable record medium.

(I) DVD-ROM and DVD-RW

At first, prior to the explanation of an embodiment of an information recording/reproducing apparatus, the DVD-ROM and the DVD-RW are schematically described which are targeted for the operation of recording or reproducing the record information.

Figure 1A:
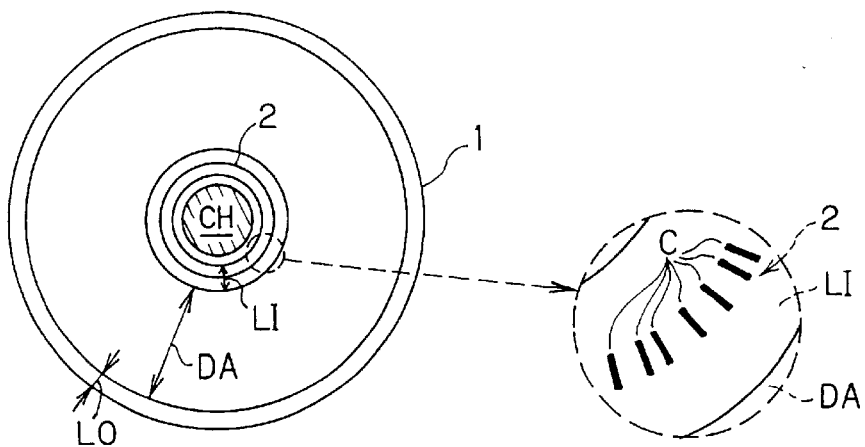
FIG. 1A is a plan view showing a configuration of a DVD-RW.
Figure 1B:
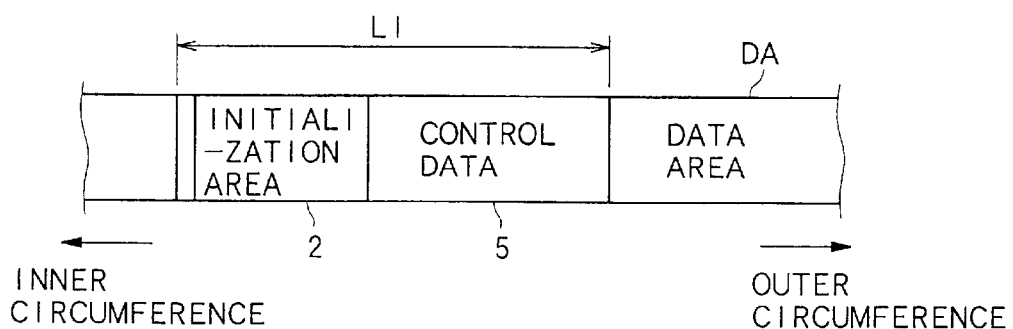
FIG. 1B is a diagram showing a record format of the DVD-RW.
Figure 1C:
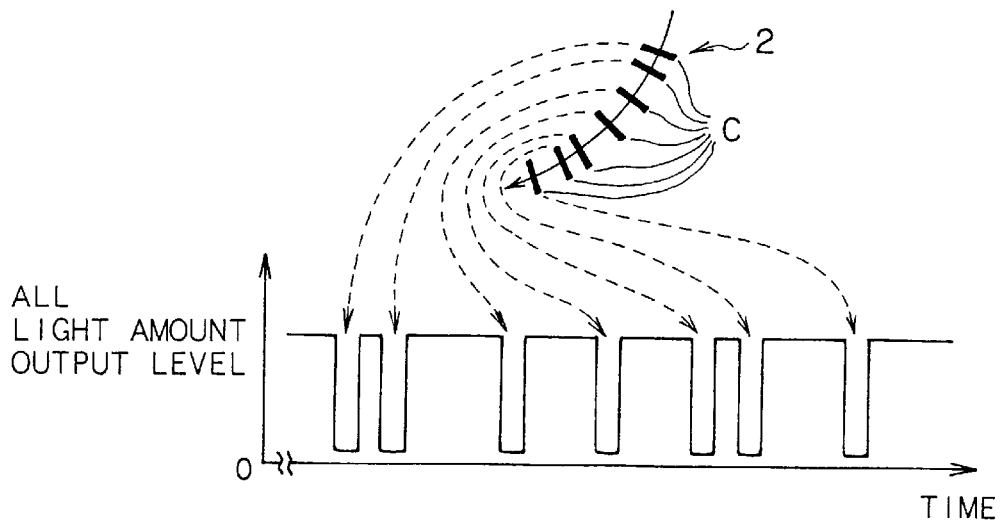
FIG. 1C is a diagram showing an example of a configuration of a code section etc., of the DVD-RW.

The DVD-RW is firstly described with reference to FIG. 1A, FIG. 1B and FIG. 1C. FIG. 1A, FIG. 1B and FIG. 1C are plan views etc., showing the DVD-RW according to the embodiment, and showing a condition thereof at the stage after the completion of an ending process (a so-called "finalizing process" involving a generation of a lead-out area) which is carried out when the generation of a lead-in area and the recording of record information onto the DVD-RW are ended in a later-described process of initializing the DVD-RW.

As shown in the plan view of FIG. 1A, a DVD-RW 1 of the embodiment after the initializing process and the ending process has a center hole CH, which is to fix the DVD-RW 1 to a spindle motor in the later-described information recording/reproducing apparatus and rotate the DVD-RW 1, at the innermost circumference thereof. Further, towards the outer circumference thereof, the DVD-RW 1 has (i) a lead-in area LI where start information having control data 5 to start recording or reproducing the record information and the like are recorded at a time of the initializing process, (ii) a data area DA, where the record information such as video information or the like is actually recorded and (iii) a lead-out area LO where end information to end recording or reproducing the record information and the like are recorded at a time of the ending process.

Moreover, as shown in FIG. 1B, an initialization area 2, which is used when the identification information needs to be recorded at a time of a shipment from a manufacturing factory (i.e., in case that the record information to be recorded onto the DVD-RW 1 needs to be protected from the viewpoint of the copyright), is formed in one portion of the lead-in area LI (this initialization area 2 may be separately referred to as an NBCA (Narrow Burst Cutting Area), and information other than an information code including the identification information is not recorded in this initialization area 2). Moreover, the control data 5 or the like is recorded in the lead-in area LI besides the initialization area 2.

Among them, a so-called "groove track" and a so-called "land track" serving as information tracks on which the record information is actually recorded are formed in the data area DA while they are adjacent and parallel to each other and constitute a spiral or coaxial around the center hole CH as a center thereof. When the record information is recorded on the groove track and the land track, it is recorded by using a so-called "phase changing manner".

On one hand, so-called "land pre-pits (LPP)" are formed on the land track at a predetermined interval in advance (actually, at a time of the shipment from the factory for manufacturing the DVD-RW 1). This land pre-pit is used, for example, in order to preliminarily record on the DVD-RW 1 the record control information required to record the record information such as address information indicative of a record position of the record information on the groove track or the land track. In the later-described information recording/reproducing apparatus, when the record information is recorded onto the DVD-RW 1, this address information is obtained in advance, and the corresponding record information is recorded onto the record position indicated by the obtained address information.

On the other hand, the groove track and the land track are formed while they are parallel to each other and wobbled at a constant wobbling frequency set in advance. This wobbling frequency of each track is used in the later-described information recording/reproducing apparatus to generate a standard clock signal under which a recording/reproducing operation in the information recording/reproducing apparatus is carried out.

No information is recorded in the lead-in area LI and the lead-out area LO at the time of the shipment from the manufacturing factory. The start information or the like and the end information or the like are firstly recorded in those areas respectively, at the time of the initializing process and the ending process of the DVD-RW 1 respectively in the later-described information recording/reproducing apparatus.

Next, the manner of recording the identification information in the initialization area 2 will be described below.

Typically, in the DVD-RW 1, a reflection film to reflect a light beam for recording and/or reproducing is in an amorphous state immediately after the manufacture of the DVD-RW 1, so that its reflection coefficient is low. A process of making the reflection coefficient higher is carried out by irradiating a laser light having a diameter of about 100 $\mu$m over the DVD-RW 1 immediately after the manufacture. At this time, a code section C, to which the process of making the reflection coefficient higher is not performed, is formed in the initialization area 2 in a radicalized manner as shown in a magnified portion of FIG. 1A (thus, the reflection coefficient of the code section C is low as compared with that of its periphery). An interval of the code section C in the circumference direction of the DVD-RW 1 is changed to accordingly record an information code having at least the identification information (e.g., an identification code number to individually identify the DVD-RW 1 itself) at the time of the shipment from the manufacturing factory.

When the record information is recorded onto the DVD-RW 1, in the later-described information recording/reproducing apparatus, the record (or reproduction) light beam is firstly irradiated onto the initialization area 2. Then, the information code is read in to accordingly obtain the identification information. At this time, in case that the light beam is irradiated onto the code section C while it is moved in a direction indicated by an arrow of an upper portion of FIG. 1C, its reflection light amount is changed as shown in a low portion of FIG. 1C, correspondingly to each of the position of the code sections C each having a lower reflection coefficient. Thus, a process of electrically extracting the change in the reflection light amount and then converting it into a binary value and the like are carried out to thereby obtain the identification information recorded in the initialization area 2. After that, a scrambling process and the like are performed with respect to the record information to be recorded on the basis of the obtained identification information, so that it is recorded onto the information track within the data area DA while the copyright protection process is performed on the record information.

By the way, if it is not necessary to record the identification information onto the DVD-RW 1 (i.e., if it is not necessary to protect the record information to be recorded on the DVD-RW 1, from the viewpoint of the copyright), no information is recorded in the initialization area 2 at the time of the shipment from the manufacturing factory, similarly to the lead-in area LI and the lead-out area LO.

Figure 2A:
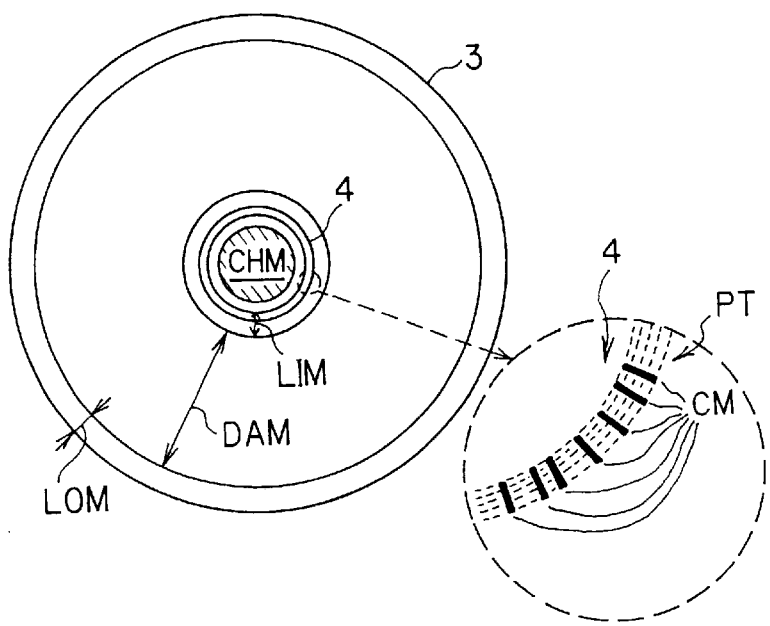
FIG. 2A is a plan view showing a configuration of a DVD-ROM.
Figure 2B:
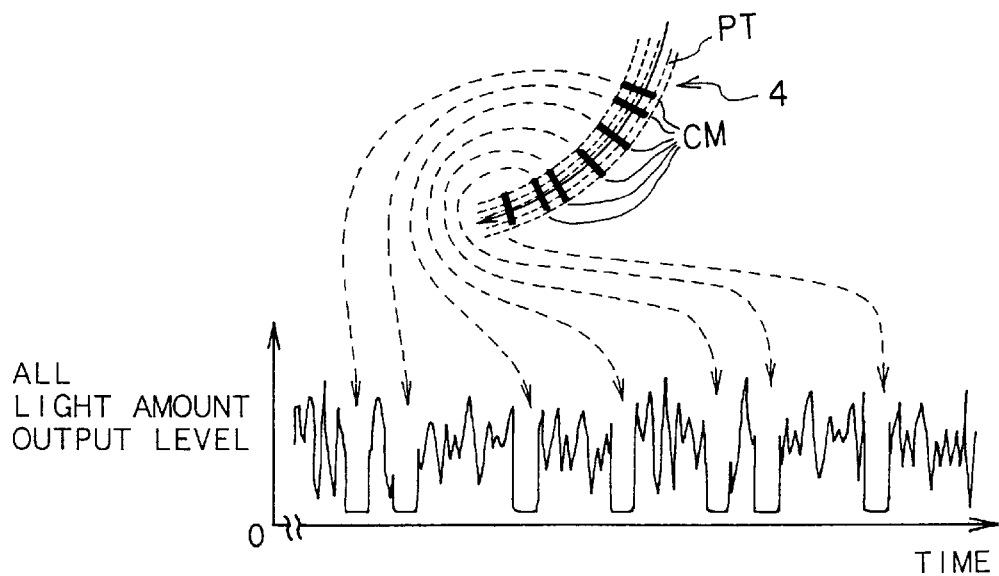
FIG. 2B is a diagram showing an example of a configuration of a code section etc., of the DVD-ROM.

Next, the DVD-ROM will be described below with reference to FIG. 2A and FIG. 2B. FIG. 2A and FIG. 2B are plan views etc., showing the DVD-ROM according to the embodiment.

As shown in the plan view of FIG. 2A, a DVD-ROM 3 of the embodiment has a center hole CHM, which is to fix the DVD-ROM 3 to the spindle motor in the later-described information recording/reproducing apparatus and rotate the DVD-RW 1, at the innermost circumference thereof, similarly to the DVD-RW 1. Further, the DVD-ROM 3 has (i) a lead-in area LIM where the start information to start recording or reproducing the record information and the like are recorded, (ii) a data area DAM, where the record information is actually recorded and (iii) a lead-out area LOM where the end information to end recording or reproducing the record information and the like are recorded.

Moreover, a BCA (Burst Cutting Area) 4 where the information code including the identification information and the like is recorded at the time of the shipment from the manufacturing factory is formed in one portion of the lead-out area LIM.

By the way, each of the start information and the like, the end information and the like, the information code and the record information is already recorded at the time of the shipment from the manufacturing factory, in case of the DVD-ROM 3.

At this time, an information track, on which the record information is actually recorded by forming a so-called phase pit, is formed in the data area DAM while it constitutes a spiral around the center hole CHM. At this time, the information track does not have the groove track or the land track as described in the case of the DVD-RW 1. One information track is formed merely through the spiral formation of the phase pit PT. Also, the above-mentioned LPP is not formed. Moreover, the information track is never wobbled. In this case, the standard clock signal required to reproduce the record information recorded in the DVD-ROM 3 is obtained in accordance with a later-described detection signal Spp, which is obtained by reproducing the record information by using a PLL (Phase Locked Loop) circuit (not shown) in the information recording/reproducing apparatus.

Here, only the information code is recorded in the initialization area 2 in the aforementioned DVD-RW 1. However, other start information and the like are recorded in overlapping with the identification information in the BCA 4 by means of the phase pit PT in the DVD-ROM 3.

Next, the manner of recording the identification information in the BCA 4 will be described below.

Typically, a reflection film for reflecting a reproduction light beam is formed in the DVD-ROM 3. It is designed such that the information recording/reproducing apparatus detects a difference between a reflection coefficient of the light beam at a position where a phase pit PT corresponding to the record information is formed and a reflection coefficient of the light beam at a position where the phase pit PT is not formed, and accordingly reads the phase pit PT. In the BCA 4, after the phase pit PT corresponding to the start information to be recorded in the BCA 4 is formed in the BCA 4, the reflection film is burnt away by a strong laser light, for example, such as a YAG (Yttrium Aluminum Garnet) laser or the like, as shown in FIG. 2A. So, a code section CM where the reproduction light beam is not reflected is formed in the radial manner. Then, the information code including at least the identification information (actually, an identification code number to individually identify the DVD-ROM 3 itself and the like) is recorded by changing an interval of the code section CM in a circumference direction of the DVD-ROM 3.

Accordingly, when the record information is reproduced from the DVD-ROM 3, the later-described information recording/reproducing apparatus firstly irradiates the reproduction light beam onto the BCA 4, reads in the information code from the BCA 4, and obtains the identification information. At this time, if the light beam is irradiated onto the code section CM while it is moved in a direction indicated by an arrow in an upper portion of FIG. 2B, its reflection light amount is changed as shown in a low portion of FIG. 2B, correspondingly to each position of the code sections CM at each of which the light beam is not reflected. Thus, the execution of the process of electrically extracting the change in the reflection light amount and then converting it into the binary value and the like enables the identification information recorded in the BCA 4 to be obtained. After that, the execution of a process of decoding a scrambling process in accordance with the obtained identification information and the like enables the record information recorded in the DVD-ROM 3 to be reproduced only in a particular information recording/reproducing apparatus for which the reproduction is admitted in advance.

By the way, the reflection light amount of the reproduction light beam moved through the BCA 4 is changed such that a change caused by the presence of the phase pit PT (namely, a change as a so-called RF (Radio Frequency) signal) is superimposed on a change caused by the presence of the code section CM, as shown in FIG. 2B. So, when the identification information corresponding to the code section CM is obtained in accordance with the change in the reflection light amount, for example, it is necessary to use a method of passing an electric signal corresponding to the reflection light amount through a low pass filter so as to remove the high frequency component from the electric signal, and then convert it into the binary value.

(II) First Embodiment of Information Recording/Reproducing Apparatus

A first embodiment of an information recording/reproducing apparatus according to the present invention will be described below by using FIG. 3 to FIG. 8.

Figure 3:
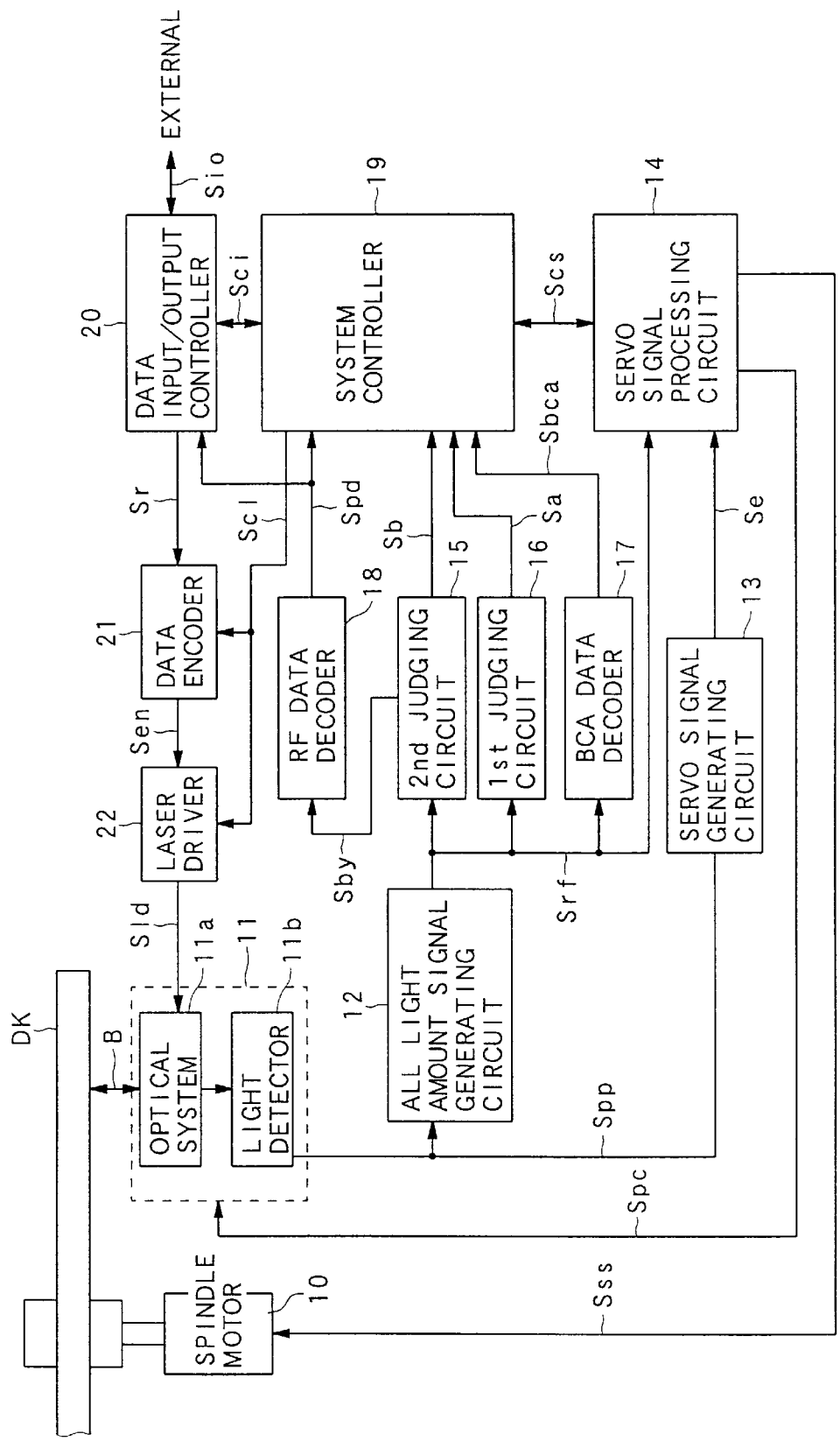
FIG. 3 is a block diagram showing a schematic configuration of an information recording/reproducing apparatus as a first embodiment of the present invention.
Figure 4:
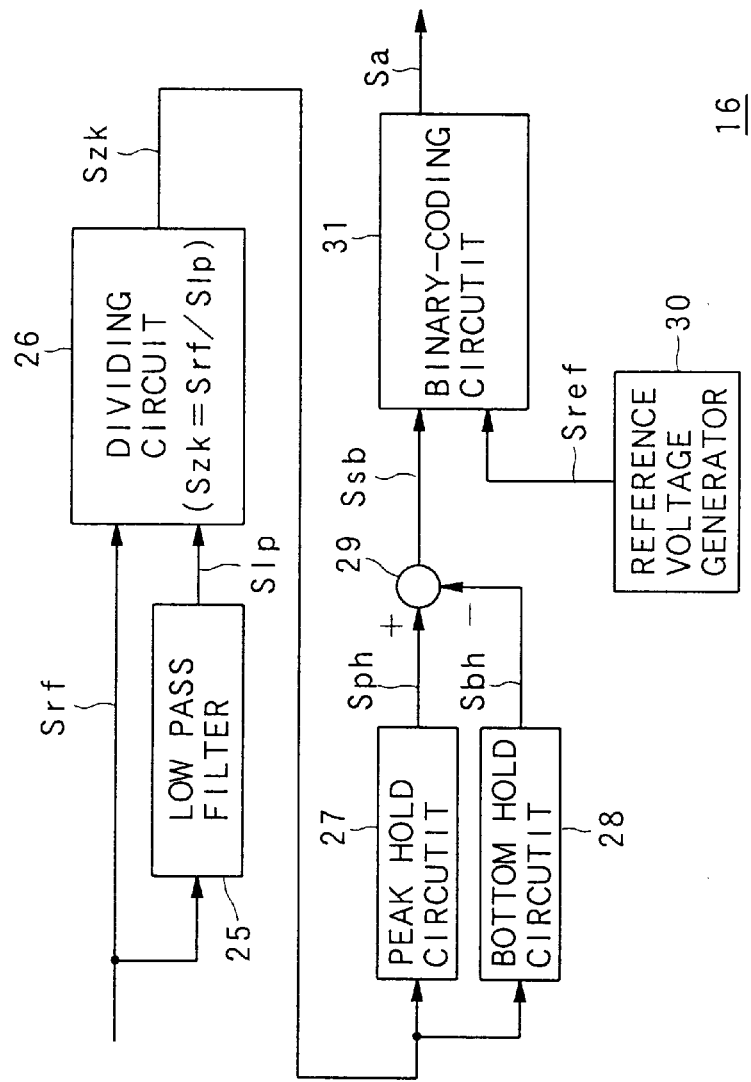
FIG. 4 is a block diagram showing a schematic configuration of a first judging circuit in the first embodiment.
Figure 5:
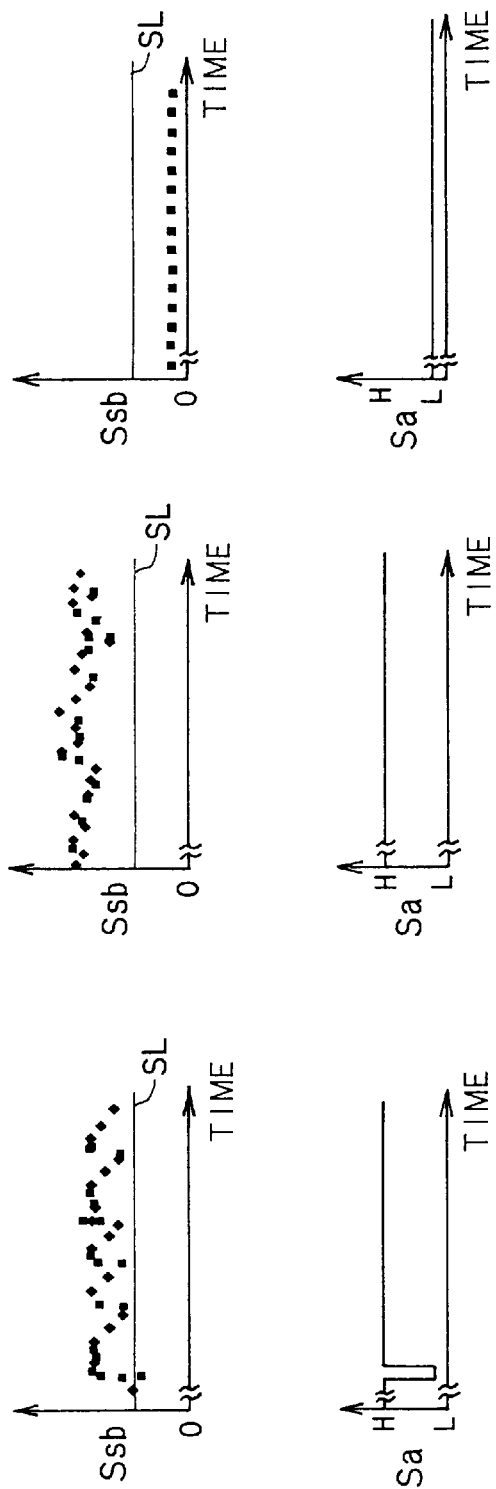
FIG. 5A is a timing chart showing an operation in the first judging circuit in the first embodiment in case that the code section is formed.
FIG. 5B is a timing chart showing an operation corresponding to an initialization area after an initializing process, in the first judging circuit in the first embodiment.
FIG. 5C is a timing chart showing an operation corresponding to the initialization area where a code section is not formed before the initializing process, in the first judging circuit in the first embodiment.
Figure 6:
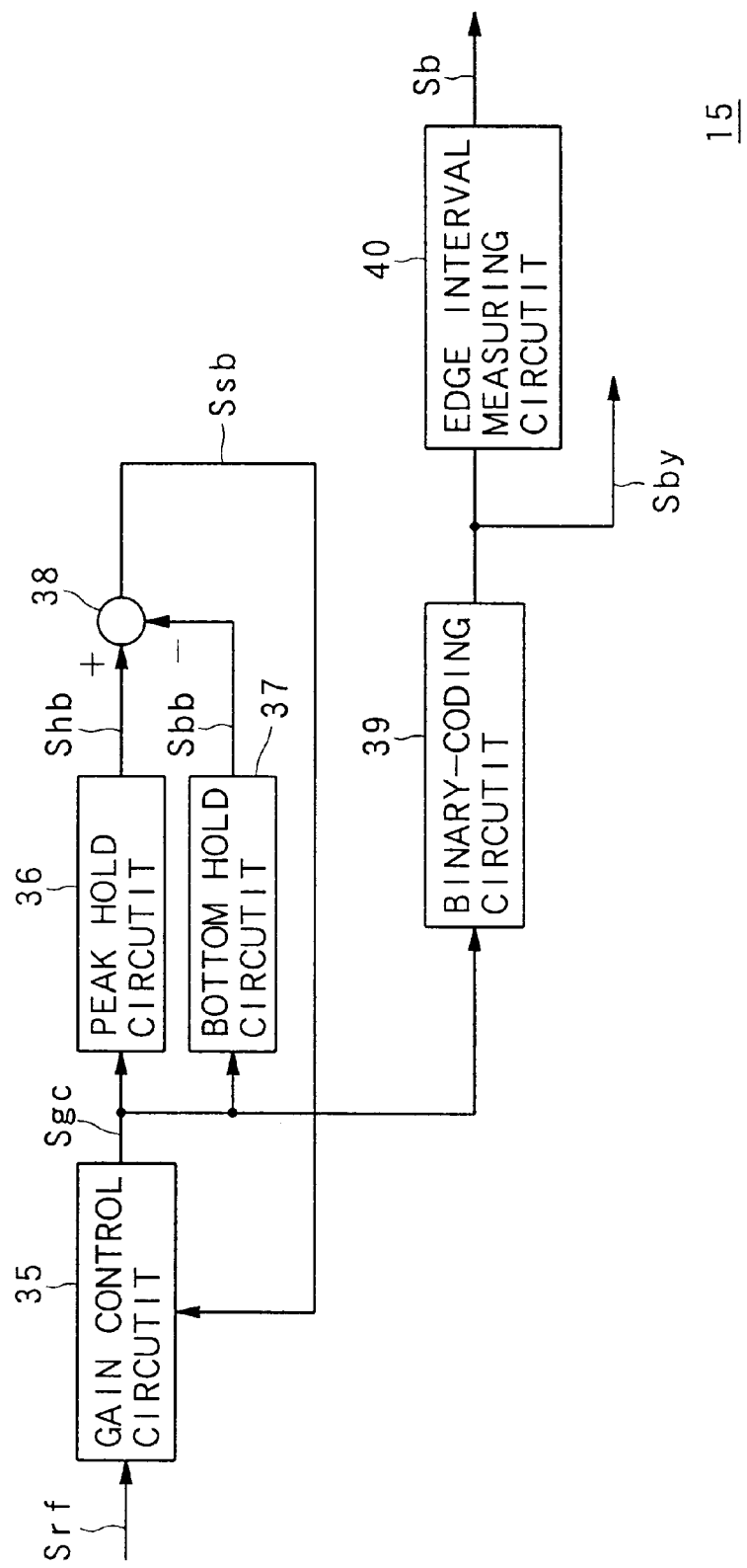
FIG. 6 is a block diagram showing a schematic configuration of a second judging circuit in the first embodiment.
Figure 7A:
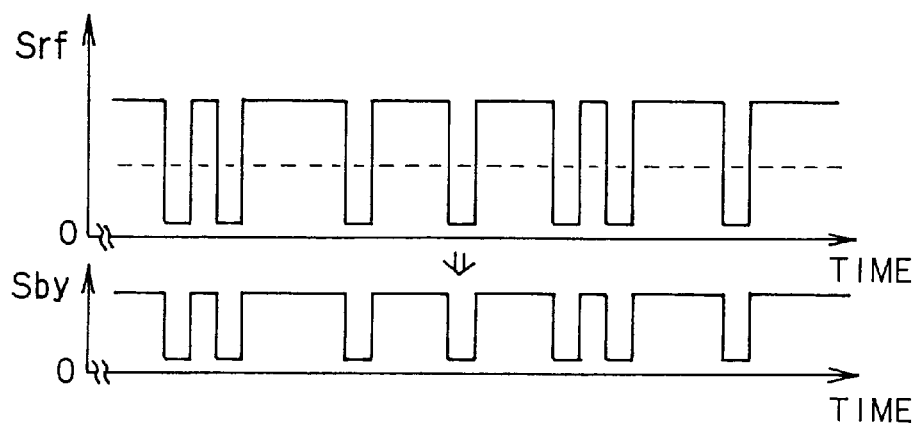
FIG. 7A is a timing chart showing an operation in the second judging circuit in the first embodiment, in case that a code section is formed.
Figure 7B:
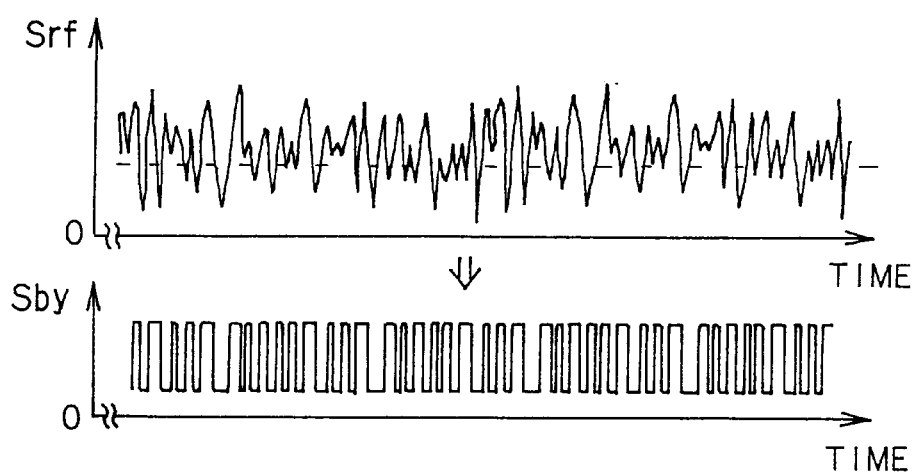
FIG. 7B is a timing chart showing an operation corresponding to an initialization area after an initializing process, in the second judging circuit in the first embodiment.
Figure 8:
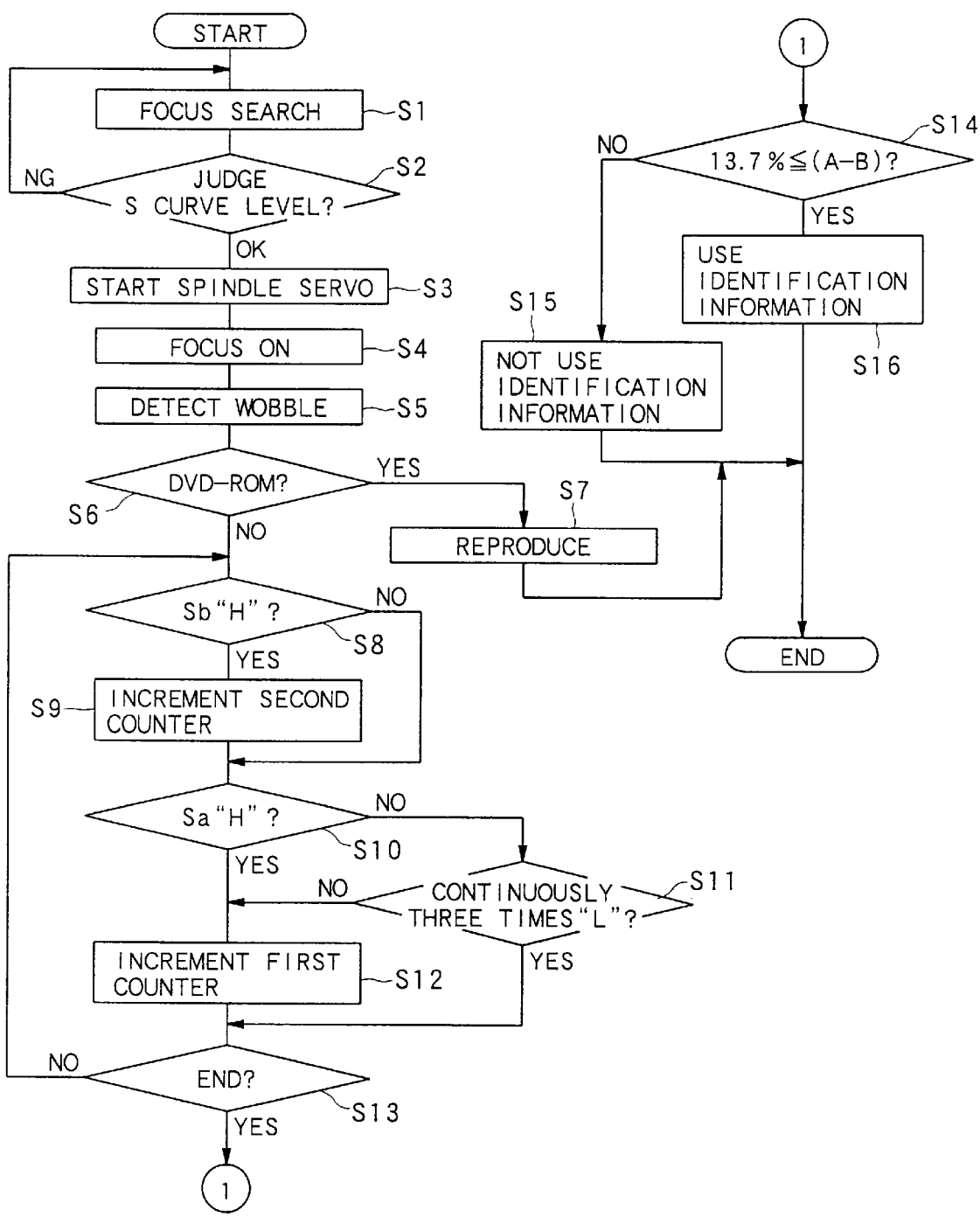
FIG. 8 is a flowchart showing the information recording/reproducing process in the first embodiment.

FIG. 3 is a block diagram showing the whole configuration of the information recording/reproducing apparatus according to the first embodiment. FIG. 4 is a block diagram showing the detailed configuration of a first judging circuit according to the first embodiment. FIG. 5A, FIG. 5B and FIG. 5C are diagrams describing the operation of the first judging circuit. FIG. 6 is a block diagram showing the detailed configuration of a second judging circuit according to the first embodiment. FIG. 7A and FIG. 7B are diagrams describing the operation of the second judging circuit. FIG. 8 is a flowchart showing the operation of the information recording/reproducing apparatus mainly as for the operation of a system controller.

At first, the whole configuration and the operation of the information recording/reproducing apparatus according to the first embodiment is described with reference to FIG. 3.

As shown in FIG. 3, an information recording/reproducing apparatus S according to the first embodiment is provided with a spindle motor 10, an optical pickup 11 serving as one example of a detector, an all reflection light amount signal generating circuit 12, a servo signal generating circuit 13, a servo signal processing circuit 14, a second judging circuit 15 serving as a second judging device, a first judging circuit 16 serving as a first judging device, a BCA data decoder 17 serving as a decoding device, an RF data decoder 18, a system controller 19 serving as examples of a moving device, a judging device, a record medium judging device and a type judging device, a data input/output controller 20, a data encoder 21 serving as a processing device and a laser driver 22 serving as a recorder.

The optical pickup 11 is provided with: an optical system 11a including a semiconductor laser, a polarization beam splitter, an objective lens and the like; and a light detector 11b for receiving a reflection light from the mounted DVD-ROM 3 or DVD-RW 1 (hereafter, which is referred to as the "optical disc DK" collectively and suitably).

Next, the schematic operation will be described below.

At first, the spindle motor 10 rotates the optical disc DK at a preset rotation number, in accordance with a spindle control signal Sss from the servo signal processing circuit 14.

At this time, the optical system 11a irradiates a record or reproduction light beam B onto the rotating optical disc DK. Then, the light detector 11b receives the reflection light from the optical disc DK of the light beam, generates a detection signal Spp corresponding to the record information, and outputs it to the all reflection light amount signal generating circuit 12 and the servo signal generating circuit 13.

Thus, the servo signal generating circuit 13 extracts an error signal Se indicative of a deviation from a position of an information track on the optical disc DK (including a vertical deviation and a horizontal deviation from the information track), with regard to a light collection position in the light beam B, from the detection signal Spp, and outputs it to the servo signal processing circuit 14.

On one hand, the all reflection light amount signal generating circuit 12 generates an RF signal Srf corresponding to the record information recorded on the optical disc DK in accordance with the detection signal Spp (actually, for example, when the light detector 11b is composed of four-divided light detecting elements, an RF signal generated by synthesizing output signals from the respective four light detecting elements), and outputs it to the first judging circuit 16, the second judging circuit 15, the BCA data decoder 17 and the servo signal processing circuit 14.

Then, while the servo signal processing circuit 14 sends and receives a control signal Scs to and from the system controller 19, the servo signal processing circuit 14 generates the spindle control signal Sss for controlling the rotation of the spindle motor 10 in accordance with the RF signal Srf and the error signal Se, and outputs it to the spindle motor 10, and also moves the objective lens (not shown) to a direction vertical or horizontal to the information track, and accordingly generates a pickup servo control signal Spc for driving an actuator (not shown) within the optical pickup 11 for controlling the position in the vertical direction and the horizontal direction of the light collection position of the light beam B, and then outputs it to the actuator.

In parallel to this, the first judging circuit 16 judges whether or not a level of the RF signal Srf is changed across a later-described standard voltage in the up and down direction, in accordance with the RF signal Srf generated correspondingly to the reflection light of the light beam B for scanning the initialization area 2 or the BCA 4, for each sample timing indicated by a standard clock signal (not shown). Then the first judging circuit 16 outputs a judgment signal Sa at a sample timing when the level of the RF signal Srf exceeds the standard voltage.

On the other hand, the second judging circuit 15 judges whether or not, for example, the RF component shown in FIG. 2B is included in the RF signal Srf, besides the signal corresponding to the code section C or CM, in accordance with the RF signal Srf generated correspondingly to the reflection light of the light beam B for scanning the initialization area 2 or the BCA 4, for each above-mentioned sample timing. Then, the second judging circuit 15 outputs a judgment signal Sb to the system controller 19 at a sample timing when the RF component is included in the RF signal Srf.

In addition to this, the second judging circuit 15 converts into an binary value the RF signal Srf generated correspondingly to the reflection light of the light beam B for scanning the initialization area 2 or the BCA 4, the lead-in area LI or LIM, and the data area DA or DAM, and generates a binary-coded signal Sby, and then outputs it to the RF data decoder 18.

Moreover, the BCA data decoder 17 decodes an information code including the identification information corresponding to the code section C or CM, when the RF signal Srf includes the signal corresponding to the code section C or CM, in accordance with the RF signal Srf generated correspondingly to the reflection light of the light beam B for scanning the initialization area 2 or the BCA 4, and then outputs it as a BCA data Sbca to the system controller 19.

Next, when the record information recorded in a data area DAM or DA is reproduced, the RF data decoder 18 decodes the binary-coded signal Sby corresponding to the reflection light of the light beam B for scanning the data area DA or DAM, and generates a decode signal Spd corresponding to the record information, and then outputs it as an input/output signal Sio through the data input/output controller 20 to an external device (not shown).

In addition to this, when the start information recorded in the lead-in area LI or LIM or the like is reproduced, the RF data decoder 18 decodes the binary-coded signal Sby corresponding to the reflection light of the light beam B for scanning the lead-in area LI or LIM, and generates a decode signal Spd corresponding to the start information or the like, and then outputs it to the system controller 19.

On the other hand, when the record information is recorded into the data area DA, while the data input/output controller 20 sends and receives a control signal Sci to and from the system controller 19, the data input/output controller 20 performs an interface process with respect to the record information inputted as the input/output signal Sio from the external device (not shown), and generates record data Sr, and then outputs it to the data encoder 21.

Accordingly, the data encoder 21 carries out a later-described scrambling process using the identification information and a so-called write strategy process and an encoding process of encoding the record data Sr by using a necessary encoding manner, in accordance with the record clock signal Scl from the system controller 19, and generates an encode data Sen, and then outputs it to the laser driver 22.

Then, the laser driver 22 generates a drive signal Sld for driving the semiconductor laser (not shown) within the optical pickup 11, correspondingly to the encode data Sen, in accordance with the record clock signal Scl from the system controller 19, and then outputs it to the semiconductor laser.

Accordingly, the record light beam B having a strength change corresponding to the record information to be recorded is mainly irradiated onto the information track of the data area DA of the DVD-RW 1, and the corresponding phase change pit is formed to thereby record the record information.

In parallel to those operations of the respective constitutional elements, in case that the record information recorded in the data area DA or DAM is reproduced, while the system controller 19 generates the control signal Sio based on the judgment signals Sa and Sb and the BCA data Sbca, the system controller 19 executes a later-described reproducing process. In case that the record information is recorded into the data area DA, the system controller 19 executes a later-described recording process while generating the control signal Sio and the record clock signal Scl in accordance with the judgment signals Sa and Sb, the BCA data Sbca as well as the decode signal Spd (i.e., the decode signal Spd corresponding to the start information recorded in the lead-in area LI or LIM or the like).

At this time, in both of the recording process and the reproducing process, the system controller 19 outputs the control signal Scs to the servo signal processing circuit 14, and thereby continues the servo control operations such as a so-called focus servo control, tracking servo control and the like.

Next, the detailed configuration and the operation of the first judging circuit 16 will be described below with reference to FIG. 4 and FIGS. 5A to 5C.

As shown in FIG. 4, the first judging circuit 16 is provided with a low pass filter 25, a dividing circuit 26, a peak hold circuit 27, a bottom hold circuit 28, a subtracting circuit 29, a standard voltage generator 30 and a binary-coding circuit 31 serving as one example of a binary-coding device.

Next, the operation of the first judging circuit 16 will be described below with reference to FIG. 4 and FIGS. 5A to 5C.

At first, the RF signal Srf inputted to the first judging circuit 16 is firstly outputted to the low pass filter 25 and the dividing circuit 26.

So, the low pass filter 25 removes a high frequency component in a preset range in the RF signal Srf, generates a low pass signal Slp, and outputs it to the dividing circuit 26.

Then, the dividing circuit 26 divides a level of the RF signal Srf by a level of the low pass signal Slp, generates a division signal Szk, and outputs it to the peak hold circuit 27 and the bottom hold circuit 28.

Here, the reason why the dividing circuit 26 executes the dividing process is as follows. That is, the first judging circuit 16 judges whether or not the level of the RF signal Srf generated correspondingly to the reflection light of the light beam B for scanning the initialization area 2 or the BCA 4 is changed across the standard voltage in the up and down direction as mentioned above, depending upon whether the level of the RF signal Srf is higher or lower than the standard voltage. Thus, it is necessary to standardize the RF signal Srf. That is, even if the RF signal Srf having a transiently high level is outputted because of a variation of an optical characteristic in the optical pickup 11 and the like, by dividing this by the low pass signal Slp, a division signal Szk which is changed similarly to it can be obtained correspondingly to the change of the RF signal Srf within a certain range.

Next, the peak hold circuit 27 detects a peak value (i.e., the maximum value) of the division signal Szk for each sample timing indicated by the standard clock signal, generates a peak hold signal Sph indicative of the peak value, and outputs it to one input terminal of the subtracting circuit 29.

In parallel to this, the bottom hold circuit 28 detects a bottom value (i.e., the minimum value) of the division signal Szk for each sample timing, generates a bottom hold signal Sbh indicative of the bottom value, and outputs it to the other input terminal of the subtracting circuit 29.

Then, the subtracting circuit 29 subtracts a value of the bottom hold signal Sbh from a value of the peak hold signal Sph, generates a subtraction signal Ssb, and outputs it to the binary-coding circuit 31.

Accordingly, the binary-coding circuit 31 generates a judgment signal Sa that becomes at "HIGH" when a level of the subtraction signal Ssb is higher than a standard voltage indicated by a standard voltage signal Sref from the standard voltage generator 30, and outputs it to the system controller 19.

Here, the manners of the respective signals in the first judging circuit 16 generated when the light beam B is moved through the initialization area 2 is described with reference to FIG. 5.

At first, when the light beam B is moved through the initialization area 2 in which the information code is preliminarily recorded, since the code section C (refer to FIG. 1) is formed in the initialization area 2, a waveform of the division signal Szk is as shown in a top stage of FIG. 5A (refer to the lower portion of FIG. 1C). In the waveform, a peak value (which is denoted by a ● mark in FIG. 5A) and a bottom value (which is denoted by a ◆ mark in FIG. 5A) at each sample timing are equal to the value of the peak hold signal Sph and the value of the bottom hold signal Sbh, respectively.

A subtraction signal Ssb generated by subtracting the value of the bottom hold signal Sbh from the value of the peak hold signal Sph is as shown in a second stage from a top of FIG. 5A.

Here, a standard voltage SL indicated by the standard voltage signal Sref is experientially assumed to be a value equal to about ¼ of an average value of the division signals Szk. Actually, it is a level denoted by a symbol SL in the second stage from the top of FIG. 5A.

If the level of the subtraction signal Ssb is higher than the standard voltage SL, namely, if it is judged that the level of the RF signal Srf generated correspondingly to the reflection light of the light beam B for scanning the initialization area 2 or the BCA 4 is changed across the standard voltage in the up and down direction, a judgment signal Sa which becomes at "HIGH" as shown in a bottom stage of FIG. 5A is outputted to the system controller 19.

By the way, if an interval between the code sections C adjacent to each other is long, the judgment signal Sa may be tentatively changed to "LOW" as shown in the bottom stage of FIG. 5A.

On one hand, if the light beam B is moved through the initialization area 2 where the information code is not recorded (i.e., in a case of the DVD-RW 1 in which the record information to be recorded does not need to be protected from the viewpoint of the copyright law) after a later-described initializing process, the code section C is not formed in the lead-in area LI, and the zero data is recorded in the initialization area 2 by the initializing process. Therefore, the waveform of the division signal Szk includes only the RF components as shown in a top stage of FIG. 5B. In the waveform, a peak value (similarly denoted by a ● mark in FIG. 5B) and a bottom value (similarly denoted by a ♦ mark in FIG. 5B) at each sample timing are equal to the value of the peak hold signal Sph and the value of the bottom hold signal Sbh, respectively.

Then, a subtraction signal Ssb generated at this time is as shown in a second stage from the top of FIG. 5B. The level is always higher than the standard voltage SL.

Thus, as the judgment signal Sa, the judgment signal Sa which becomes always at "HIGH", as shown in a bottom stage of FIG. 5B, is outputted to the system controller 19.

On the other hand, if the light beam B is moved through the initialization area 2 where the information code is not recorded prior to a later-described initializing process (namely, prior to an initializing process for performing a so-called format process (which includes a process of writing the start information and the like) with respect to the lead-in area LI immediately after the DVD-RW 1 is mounted in the information recording/reproducing apparatus S), any information is neither recorded in the lead-in area LI nor the code section C. Therefore, the waveform of the division signal Szk has substantially constant values as shown in a top stage of FIG. 5C. In the waveform, a peak value (similarly denoted by a ● mark in FIG. 5C) and a bottom value (similarly denoted by a ♦ mark in FIG. 5C) at each sample timing also have substantially constant values, respectively.

Then, a subtraction signal Ssb obtained at this time is as shown in a second stage from the top of FIG. 5C. Its level is always lower than the standard voltage SL.

Thus, the judgment signal Sa which becomes always at "LOW", as shown in a bottom stage of FIG. 5C, is outputted to the system controller 19.

Next, the detailed configuration and the operation of the second judging circuit 15 will be described below with reference to FIG. 6 and FIG. 7.

As shown in FIG. 6, the second judging circuit 15 is provided with a gain control circuit 35, a peak hold circuit 36, a bottom hold circuit 37, a subtracting circuit 38, a binary-coding circuit 39 serving as one example of a binary value converter, and an edge interval measuring circuit 40.

Next, its operation will be described below with reference to FIG. 6 and FIG. 7.

At first, the RF signal Srf inputted to the second judging circuit 15 is outputted to the gain control circuit 35.

Then, the gain control circuit 35 controls an amplitude of the RF signal Srf so that it is constant, in accordance with a later-described subtraction signal Ssb, and generates a gain control signal Sgc, and then outputs it to the peak hold circuit 36, the bottom hold circuit 37 and the binary-coding circuit 39.

Next, the peak hold circuit 36 detects a peak value (i.e., the maximum value) of the gain control signal Sgc, generates a peak hold signal Shb indicative of the peak value, and outputs it to one input terminal of the subtracting circuit 38.

In parallel to this, the bottom hold circuit 37 detects a bottom value (i.e., the minimum value) of the gain control signal Sgc, generates a bottom hold signal Sbb indicative of the bottom value, and outputs it to the other input terminal of the subtracting circuit 38.

Then, the subtracting circuit 38 subtracts a value of the bottom hold signal Sbb from a value of the peak hold signal Shb, generates the subtraction signal Ssb indicative of the amplitude variation in the RF signal Srf, and feeds it back to the gain control circuit 35.

In parallel to them, the binary-coding circuit 39 converts the gain control signal Sgc whose amplitude is made constant, into a binary value by using a known binary-coding method, and generates a binary-coded signal Sby, and then outputs it to the edge interval measuring circuit 40 and the RF data decoder 18 (shown in FIG. 3).

Here, the manners of the respective signals in the second judging circuit 15 generated when the light beam B is moved through the initialization area 2 is described with reference to FIG. 7A and FIG. 7B.

At first, when the light beam B is moved through the initialization area 2 where the information code is recorded, since the code section C (refer to FIG. 1) is formed in the initialization area 2, the waveform of the RF signal Srf is as shown in a top stage of FIG. 7A (refer to the lower portion of FIG. 1C). Thus, also in the corresponding binary-coded signal Sby, the edge interval is wide as shown in a bottom stage of FIG. 7A.

On one hand, if the light beam B is moved through the initialization area 2 where the information code is not recorded after the later-described initializing process, since the zero data besides the code section C is recorded in the initialization area 2 as described above, the waveform of the RF signal Srf includes only the RF components as shown in a top stage of FIG. 7B. Thus, also in the corresponding binary-coded signal Sby, each edge interval is narrow as shown in a bottom stage of FIG. 7B.

Therefore, the edge interval measuring circuit 40 judges whether the edge interval is wide or narrow, for each above-mentioned sample timing, and generates the judgment signal Sb, which becomes at "HIGH" if the edge interval is narrow (namely, if the lead-in area LI has no initialization area 2 (in other words, if the information code including the identification information) and only the start information and the like are recorded). Then, the edge interval measuring circuit outputs it to the system controller 19.

At this time, actually, the edge interval measuring circuit 40 measures an interval between a leading edge and a trailing edge of the binary-coded signal Sby, namely, an edge interval between the respective binary-coded signals Sby by counting a standard clock cycle T of the record information to be recorded onto the DVD-ROM 3 or the DVD-RW 1 (typically, it is referred to as a channel bit clock, and it is the same period as the standard clock signal). If the measured result is greater than 2 T and less than 20 T, the edge interval measuring circuit 40 judges that the RF component corresponding to the start information and the like is included in the RF signal Srf (thus, the information code is not recorded in the initialization area 2), and then outputs the judgment signal Sb indicative of "HIGH".

The reason why the standard range to judge the inclusion of the RF component is greater than 2 T and less than 20 T is that if the edge interval is equal to or less than 2 T, it can be judged as a mere noise component, and there is no case in which the interval between the code sections C is less than 20 T, in view of the rule on which the DVD-RW 1 must be based.

In the record information to be recorded in the data area DA, the start information and the like, and the end information and the like, it is prescribed from the rule that the end interval is not less than 3 T and not more than 14 T.

Next, the information recording/reproducing process according to the first embodiment executed mainly by the system controller 19 will be described below with reference to FIG. 8.

As shown in FIG. 8, in the information recording/reproducing process according to the first embodiment, when the optical disc DK (either one of the DVD-RW 1 and the DVD-ROM 3) is inserted into the information recording/reproducing apparatus S and is fixed to the spindle motor 10, the objective lens within the optical pickup 11 is moved in the reciprocating manner in a direction perpendicular to an information record surface in the optical disc DK. Thus, a focal point of the light beam B is sandwiched between the information record surfaces and is shifted to a direction vertical to it. Then, a so-called focus search operation is carried out by using an astigmatism method (Step S1).

Then, it is judged whether or not a focus error signal (which is a part of the error signal Se) having an S-shaped (S-curved) waveform to be included in the detection signal Spp associated with the focus search operation can be detected by the servo signal processing circuit 14 and further its output level can be judged (Step S2).

Then, if the focus error signal cannot be detected (Step S2: NO), the operational flow returns back to the step S1, in order to repeat the focus search operation until it can be detected. On the other hand, if the focus error signal can be detected to then judge its output level (Step S2: OK), the output level is transiently recorded in a memory (not shown) in the system controller 19. Then, the spindle motor is actuated to start a spindle servo control (Step S3). Also, a serve loop in the focus servo control is made into a closed condition, and the focus servo control is started (Step S4).

Then, the wobbling of the information track which should be present only in case of the DVD-RW 1 is detected under the condition that the spindle servo control and the focus servo control are continuously executed (Step S5), to thereby judge whether the currently mounted optical disc is the DVD-ROM 3 (step S6). If the wobbling cannot be detected, it is judged that the optical disc DK currently being mounted in the information recording/reproducing apparatus S is the DVD-ROM 3 (Step S6: YES). Then, the light beam B currently being radiated is used as the reproduction light beam, and the record information recorded in the DVD-ROM 3 is reproduced (Step S7). Then, the processes in the information recording/reproducing apparatus S are ended.

At this time, an output level of the focus error signal in a so-called one-layer DVD-ROM having only one information record surface is typically higher than an output level of the focus error signal in a so-called two-layer DVD-ROM having two information record surfaces. Thus, if the output level of the focus error signal judged at the step S2 is higher than a preset standard level, the mounted DVD-ROM 3 is judged as the one-layer DVD-ROM, and the reproducing operation is carried out. If the judged output level of the focus error signal is lower than the standard level, the mounted DVD-ROM 3 is judged as the two-layer DVD-ROM, and the reproducing operation is carried out.

Moreover, if the record information recorded on either DVD-ROM 3 is reproduced, the identification information within the BCA 4 in the DVD-ROM 3 mounted in the information recording/reproducing apparatus S is firstly read in. While this identification information is used as a decode key, a scrambling process performed on the record information is decoded to accordingly carry out the reproduction.

On one hand, if the wobble can be detected at the judgment of the step S6, it is then judged whether the optical disc DK currently being mounted in the information recording/reproducing apparatus S is the DVD-RW 1 or a DVD-R (DVD-Recordable that is a DVD in which information can be recorded only one time) which is another type of the recordable DVD having the wobbling information track (Step S6: NO).

At this time, when the DVD-RW 1 and the DVD-R are compared with regard to the output level of the focus error signal, the output level of the focus error signal of the DVD-R is typically higher than the output level of the focus error signal of the DVD-RW 1. Thus, if the output level of the focus error signal judged at the step S2 is higher than preset other standard levels, the mounted DVD is judged as the DVD-R, and the recording operation after that is carried out. If the judged output level of the focus error signal is lower than the other standard levels, the mounted DVD is judged as the DVD-RW 1, and the recording operation after that can be carried out. However, the DVD-R is not considered in the first embodiment. Hence, after that, the respective operations are described under the assumption that the mounted DVD is the DVD-RW 1.

On the other hand, if it is judged in the judgment of the step S6 that the mounted DVD is the DVD-RW 1 (Step S6: NO), it is then judged whether or not the judgment signal Sb is at "HIGH" at a certain sample timing, namely, whether or not the RF component is included in the RF signal Srf corresponding to the reflection light of the light beam B moved through the initialization area 2 (Step S8).

Then, if the RF component is included in the RF signal Srf at the sample timing (Step S8: YES), a second counter (not shown) in the system controller 19 is incremented by 1 (Step S9).

On the other hand, if the RF component is not included in the RF signal Srf at the sample timing (Step S8: NO), the operational flow proceeds to a next step S10 as it is.

Then, it is judged whether or not the judgment signal Sa is at "HIGH" at the sample timing (Step S10).

Then, if the RF signal Srf is changed across the standard voltage in the up and down direction at the sample timing, namely, if the code section C is formed in the initialization area 2 (refer to FIG. 5A) or if the later-described initializing process is performed with respect to the initialization area 2, and the start information and the like are recorded therein (refer to FIG. 5B) (Step S10: YES). Then, a first counter (not shown) in the system controller 19 is incremented by 1 (Step S12).

On one hand, in the judgment at the step S10, if it is judged that the judgment signal Sa is at "LOW", namely, if it is judged that the RF signal Srf is not changed across the standard voltage in the up and down direction (Step S10: NO), it is then judged whether or not the judgment signal Sa is similarly at "LOW" at continuously three sample timings (Step S11).

If the judgment signal Sa is at "LOW" continuously three times (Step S11: YES), it is determined that the judgment signal Sa is at "LOW", namely, it is judged that no information is recorded in the initialization area 2 (refer to FIG. 5C). The operational flow proceeds to a step S13 as it is.

On the other hand, at the judgment at the step S11, if the judgment signal Sa is not at "LOW" continuously three times (Step S11: NO), it is impossible to determine that the judgment signal Sa is at "LOW". Thus, similarly to the case when the judgment at the step S10 is "HIGH", it is judged that the RF signal Srf is changed across the standard voltage in the up and down direction at the sample timing, or the later-described initializing process is performed with respect to the initialization area 2, and the start information and the like are recorded therein. Then, the operational flow proceeds to the step S12.

It is then judged whether or not all the processes at the steps S8 to S12 have been completed for the number of sample timings required to judge the kind of the preset optical disc DK (Step S13).

If they have not been completed yet (Step S13: NO), the operational flow returns to the step S8, so as to perform the processes at the steps S8 to S12 on the RF signal Srf at a next sample timing.

On the other hand, at the judgment at the step S13, if the processes at the steps S8 to S12 have been completed for all the sample timings (Step S13: YES), a count value "B" of a second counter is subtracted from a current count value "A" of the first counter. Then, it is judged whether or not its result is greater than the number of sampling timings required to judge the kind of the optical disc DK, namely, 13.9% of the number of sample timings corresponding to one round of the DVD-RW 1 in a radius position of the DVD-RW 1 in which the initialization area 2 is formed (Step S14).

At this step S14, the second counter counts the number of sample timings judged as "YES" at the step S8 (namely, it is judged that the RF component is included in the RF signal Srf corresponding to the initialization area 2). On the other hand, the first counter counts the number of sample timings judged as "YES" at the step S10 or judged as "NO" at the step S11 (namely, it is judged that the code section C is formed in the initialization area 2 or the start information and the like are recorded in the initialization area 2). After all, the subtraction of the count value of the second counter from the count value of the first counter is equivalent to the operation for calculating the number of sample timings when it is judged that the zero data is recorded in the initialization area 2 (namely, the RF component is included) or the code section C is formed in the initialization area 2, and also it can be judged that the RF component is not included in the RF signal Srf corresponding to the initialization area 2, namely, the code section C is formed in the initialization area 2. So, it is judged whether or not this subtraction result is greater than 13.9% of the number of sample timings required to judge the kind (step S14).

The reason why 13.9% of the number of sample timings required to judge the kind is used as the standard is as follows. That is, in accordance with the standard of the DVD-RW 1, a length in the circumference direction of the initialization area 2 is defined as a length of 17.41% of a length in a circumference direction at a radius position of the DVD-RW 1 in which the initialization area 2 is formed. Thus, if it can be judged that the code section C is formed in the initialization area 2 for the number of sample timings corresponding to a length of 13.9% which is equivalent to 80% of 17.41%, it can be determined to judge that the code section C is formed in the initialization area 2.

According to the judgment at the step S14, if the subtraction result is greater than 13.9% (Step S14: YES), it is judged that the information code is generated through the code section C in the initialization area 2. The operation of recording or reproducing the record information onto or from the DVD-RW 1 is carried out by using the identification information (Step S16). Then, the processes in the information recording/reproducing apparatus S are ended.

At this time, at the step S16, in case that the record information is recorded onto the DVD-RW 1, the so-called initializing process is carried out. That is, the format process is firstly performed with respect to the lead-in area LI in the DVD-RW1 mounted in the information recording/reproducing apparatus S. Next, the identification information in the information code is decoded by the BCA data decoder 17. This is used to perform the so-called scrambling process on the record information to be recorded in the data area DA and then record it. By the way, the initializing process writes the zero data to the initialization area 2.

On one hand, in case that the record information recorded in the DVD-RW 1 is reproduced, the identification information in the initialization area 2 in the DVD-RW 1 mounted in the information recording/reproducing apparatus S is firstly read in. While it is used as the decode key, the scrambling process performed with respect to the record information is decoded to accordingly carry out the reproduction.

On the other hand, according to the judgment at the step S14, if the subtraction result is not greater than 13.9% (Step S14: NO), it is judged that the code section C is not formed in the initialization area 2. Then, the operation of recording or reproducing the record information onto or from the DVD-RW 1 is carried out without using the identification information (Step S15). Then, the processes in the information recording/reproducing apparatus S are ended.

At this time, at the step S15, in case that the record information is recorded onto the DVD-RW 1, the initializing process is firstly carried out. Then, the record information is recorded as it is without the execution of the scrambling process.

On the other hand, in case that the record information recorded on the DVD-RW 1 is reproduced, the scrambling process is not originally performed with respect to the record information. So, the record information is reproduced as it is.

As mentioned above, according to the information recording/reproducing process in the information recording/reproducing apparatus S of the first embodiment, it is judged whether or not the information code is already recorded in the optical disc DK, in accordance with the RF signal Srf outputted from the optical pickup 11 at the time of the movement to the initialization area 2 or the BCA 4. Thus, the judgment result as to whether or not the information code is recorded can be reflected to the processes after that.

Also, the presence or absence of the record of the information code is judged in accordance with the output level of the RF signal Srf and the edge interval in the binary-coded signal Sby. Thus, it is possible to surely detect the presence or absence of the information code.

Moreover, the standard range to judge the presence or absence of the information code in accordance with the edge interval in the binary-coded signal Sby is the range that is longer than 2 times of the standard clock cycle and shorter than 21 times thereof. Thus, the influence of other noises and the like can be suppressed to surely detect the presence or absence of the information code.

Furthermore, it is judged whether or not the optical disc DK is the DVD-ROM 3, in accordance with the RF signal Srf. Also, the kind of the DVD-RW 1 (the DVD-RW 1 in which the information code is recorded or the DVD-RW 1 in which the information code is not recorded) is judged in accordance with the presence or absence of the record of the information code. Thus, after the judgment of the kind of the optical disc DK, its result can be reflected to the various processes after that.

Also, it is judged whether or not the optical disc DK is the DVD-ROM 3, depending upon whether or not the information track is wobbling. Thus, it is possible to surely judge whether or not the record medium is the readable record medium (i.e., the read only type record medium).

Moreover, the information code including at least the identification information for individually identifying the DVD-RW 1 itself is obtained to then carry out the scrambling process of controlling the reproduction of the record information. After that, the record information is recorded onto the DVD-RW 1. Thus, the record information can be recorded by performing a different scrambling process for each DVD-RW 1. Hence, the record information recorded on the DVD-RW 1 can be protected from being illegally copied. Therefore, it is possible to surely protect the copyright in relation to the record information.

(II) Second Embodiment

Next, a second embodiment according to the present invention will be described below by tentatively using FIG. 3 and FIG. 8.

In the above described first embodiment, the presence or absence of the record of the information code is judged by the process in the system controller 19 using the judgment signal Sa from the first judging circuit 16 and the judgment signal Sb from the second judging circuit 15. Accordingly, the manner of recording or reproducing the record information is changed. Besides it, by changing the judging method in the second judging circuit 15 as described later, the judgment can be done similarly to that of the information recording/reproducing apparatus S in the first embodiment, while the first judging circuit 16 is omitted.

That is, as the configuration of the information recording/reproducing apparatus according to the second embodiment, it is possible to use the configuration in which the first judging circuit 16 is removed from the configuration of the information recording/reproducing apparatus S according to the first embodiment.

The process in the second judging circuit 15 in case of judging the presence or absence of the record of the information code by using only the second judging circuit 15 will be described below in detail.

The second judging circuit 15 in the first embodiment judges that the RF component corresponding to the start information or the like is included in the RF signal Srf if the edge interval of the binary-coded signal Sby is longer than 2 T and shorter than 20 T, by using the edge interval measuring circuit 40 included therein. On the basis of the judged result, it judges the presence or absence of the information code. In contrast, the second judging circuit 15 in the second embodiment judges whether or not the edge interval of the binary-coded signal Sby is longer than 38 T and shorter than 1000 T, so as to directly judge that the information is recorded if the edge interval is within the range. In this case, with regard to the information recording/reproducing process in the system controller 19, the steps S8 and S9 are deleted from the flowchart shown in FIG. 8. Also, the presence or absence of the record of the information code including the identification information is judged directly from the process results at the steps S10 to S12. The recording/processing process (the step S15 or S16 of FIG. 8) is executed in accordance with the judged result.

Here, the reasons why "38 T" and "1000 T" are employed as the edge intervals serving as the thresholds to judge that the information code is recorded as mentioned above are that, when the edge intervals corresponding to intervals of a plurality of kinds of intervals defined on the standard as the interval in the circumference direction of the DVD-RW 1 in each of the above-mentioned code sections C are converted into the standard clock cycle T, the range of the intervals is longer than about 38 T and shorter than about 1000 T.

By the way, the processes other than the above-mentioned judging process in the information recording/reproducing apparatus according to the second embodiment are basically similar to those of the information recording/reproducing apparatus S according to the first embodiment. Thus, the explanation of the detailed portions is omitted.

As mentioned above, according to the information recording/reproducing process in the information recording/reproducing apparatus S according to the second embodiment, it is judged whether or not the information code is recorded on the optical disc DK, in accordance with the RF signal Srf outputted from the optical pickup 11 at the time of the movement to the initialization area 2 or the BCA 4. Thus, the judgment result as to whether or not the information code is recorded can be reflected to the processes after that.

Also, the presence or absence of the record of the information code is judged depending upon whether or not the edge interval in the binary-coded signal Sby is within the range of the edge interval corresponding to only the information code. Thus, it is possible to surely detect the presence or absence of the information code.

Moreover, it is judged whether or not the optical disc DK is the DVD-ROM 3, in accordance with the RF signal Srf. Also, the kind of the DVD-RW 1 is judged in accordance with the presence or absence of the record of the information code. Thus, after the judgment of the kind of the optical disc DK, its result can be reflected to the various processes after that.

Furthermore, it is judged whether or not the optical disc DK is the DVD-ROM 3, depending upon whether or not the information track is wobbling. Thus, it is possible to surely judge whether or not the record medium is the readable type d medium.

Furthermore, the information code including at least the identification information for individually identifying the DVD-RW 1 itself is obtained to then carry out the scrambling process of controlling the reproduction of the record information. After that, the record information is recorded onto DVD-RW 1. Thus, the record information can be recorded by performing the different scrambling process for each DVD-RW 1. Hence, the record information to be recorded onto the DVD-RW 1 can be protected from being illegally copied. Therefore, it is possible to surely protect the copyright in relation to the record information.

(III) Modified Embodiment

Modified embodiments according to the present invention will be described below with reference to FIG. 9A and FIG. 9B.

At first, as a first modified embodiment, as for the judging process in the first judging circuit 16, the first embodiment uses the constant standard voltage SL and generates the judgment signal Sa. Besides it, immediately after the irradiation position of the light beam B is shifted to the initialization area 2, or immediately before the actual judgment start process, the standard voltage SL itself may be changed to a value suitable for the detection of the presence or absence of the record of the information code.

Even if the value of the subtraction signal Ssb is tentatively small as shown in a second stage from a top of FIG. 9A since a value of a bottom hold signal Sbh is tentatively high, for example, because of a long interval between code sections C adjacent to each other as shown in a top stage of FIG. 9A, the usage of a new standard voltage SL' as a threshold disables the judgment signal Sa to be changed to "LOW" erroneously and tentatively as denoted by a solid line in a bottom stage of FIG. 9A. Also, if a level of the RF signal Srf is changed across the standard voltage in the up and down direction as denoted by a dashed line in the bottom stage of FIG. 9A, it is possible to accurately generate the judgment signal Sa which becomes at "HIGH".

As a second modified embodiment, as for the judging process in the first judging circuit 16, the first embodiment uses a constant time constant, and generates the bottom hold signal Sbh. Besides it, immediately after the irradiation position of the light beam B is shifted to the initialization area 2, or immediately before the actual judgment start process, the time constant may be changed to a value suitable to the detection of the presence or absence of the record of the information code.

In this case, the change in the bottom hold signal Sbh itself is gentle as shown in a top stage of FIG. 9B. Thus, the value of the subtraction signal Ssb is never tentatively small as shown in a second stage from a top of FIG. 9B. If the level of the RF signal Srf is changed across the standard voltage in the up and down direction, it can be designed such that the judgment signal Sa becomes accurately at "HIGH" as denoted by a solid line in a bottom stage of FIG. 9B.

Further, the usage of the DVD-RW 1 as the writable record medium is described in the respective embodiments and modified embodiments. Other than that, as a third modified embodiment, it can be designed to use the DVD-R as the writable record medium, and firstly obtain the identification information at a time of reproducing, and thereby cancels the scrambling process, and accordingly reproducing the record information recorded through the scrambling process using the identification information at a time of recording.

Furthermore, as a fourth modified embodiment, it can be designed as follows. That is, even if it is judged that the code section C is not formed in the initialization area 2 as the result in the judgment using the first judging circuit 16 and the second judging circuit 15, if the BCA data decoder 17 can actually decode a part of the information code or the entire information code, it is judged that the code section C is formed in the initialization area 2 irrespectively of the results judged by the first judging circuit 16 and the second judging circuit 15, and the information recording/reproducing process can be carried out after that. By the way, whether or not the part of the information code or the entire information code can be decoded can be judged, for example, by detecting an error flag signal or a so-called synchronization clock signal outputted from the BCA data decoder 17.

In this case, if the information code can be actually decoded, it is judged that the information code is recorded on the DVD-RW 1. Thus, it is possible to protect the process using the information code to be originally executed from being unexecuted.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-374266 filed on Dec. 28, 1999 including the specification, claims, drawings and summary is incorporated herein by reference in its entirety.

What is claimed is:

1. A record medium judging apparatus for judging a type of a writable record medium on which record information can be written, whether the writable record medium is (i) a first writable record medium on which an information code including at least identification information to individually identify the writable record medium is recorded or (ii) a second writable record medium on which the information code is not recorded, said record medium judging apparatus comprising:

a detecting device which optically detects information recorded on said writable record medium to thereby output an output signal;

a moving device which moves said detecting device onto a set area, which is an area on said writable record medium where the information code is supposed to be recorded;

a code judging device which judges whether or not the information code is recorded on said writable record medium, in accordance with the output signal outputted from said detecting device moved on said set area; and a type judging device which judges whether said writable record medium is said first writable record medium or said second writable record medium based on the judging result by said code judging device.

2. The record medium judging apparatus according to claim 1, wherein said code judging device comprises a binary-coding device which converts the output signal into a binary value and outputs a binary-coded signal, and said code judging device judges that the information code is recorded on said writable record medium if an edge interval, which is an interval of a switching timing between binary values of the outputed binary-coded signal, is within a preset interval.

3. The record medium judging apparatus according to claim 1, wherein said code judging device comprises:

a first judging device which judges whether or not an output level of the output signal is changed across a preset standard level;

a binary-coding device which converts the output signal into a binary value and outputs a binary-coded signal; and a second judging device which judges whether or not an edge interval, which is an interval of a switching timing between binary values of the outputed binary-coded signal, is within an identification interval range preset so as to include the edge interval of the output signal corresponding to the record information, and said code judging device judges that the information code is recorded on said writable record medium if a result judged by said first judging device indicates that the output level is changed across the standard level and if a result judged by said second judging device does not indicate that the edge interval of the output signal corresponding to the information code is within the identification interval range.

4. The record medium judging apparatus according to claim 3, wherein the edge interval of the output signal corresponding to the information code is within a range, which is equal to or greater than 3 times of a preset standard clock cycle and is equal to or less than 14 times of the standard clock cycle, and the identification interval range is longer than 2 times of the standard clock cycle and is shorter than 20 times of the standard clock cycle.

5. The record medium judging apparatus according to claim 1, further comprising a decoding device which decodes the information code, wherein, even if said code judging device judges that the information code is not recorded on said writable record medium, if the information code is decoded by said decoding device, it is judged that the information code is recorded on said writable record medium.

6. A record medium judging apparatus for judging whether a record medium is (i) a writable record medium on which an information code including at least identification information to individually identify the writable record medium is recorded, (ii) a writable record medium on which the information code is not recorded or (iii) a readable record medium on which record information is recorded in a read only manner, said record medium judging apparatus comprising:

(a) a code judging apparatus comprising:
  a detecting device which optically detects the information recorded on said record medium to thereby output an output signal;
  a moving device which moves said detecting device onto a set area, which is an area on said writable record medium where the information code is supposed to be recorded; and
  a judging device which judges whether or not the information code is recorded on said writable record medium, in accordance with the output signal outputted from said detecting device moved on said set area, (b) a readable record medium judging device which judges whether or not said record medium is said readable record medium, on the basis of the output signal which is obtained by detecting the record information, and (c) a type judging device which judges (i) that said record medium is said writable record medium, on which the information code is recorded, if said code judging device judges that the information code is recorded, and that (ii) said record medium is said writable record medium, on which the information code is not recorded, if said code judging device judges that the information code is not recorded.

7. The record medium judging apparatus according to claim 6, wherein said writable record medium includes wobbled information track, and said readable record medium judging device judges that said record medium is said readable record medium if the wobbled information track is not detected on said record medium.

8. The record medium judging apparatus according to claim 6, wherein said writable record medium comprises a DVD-RW while said readable record medium comprises a DVD-ROM.

9. The information recording apparatus comprising:
(a) a code judging apparatus comprising:
  a detecting device which optically detects information recorded on a writable record medium, in which record information can be written, to thereby output an output signal;
  a moving device which moves said detecting device onto a set area, which is an area on said writable record medium where an information code including at least identification information to individually identify the writable record medium is supposed to be recorded; and
  a judging device which judges whether or not the information code is recorded on said writable record medium, in accordance with the output signal outputted from said detecting device moved on said set area, (b) a processing device which applies a control process, which is to control an operation of reproducing the record information from said writable record medium after recording, with respect to the record information to be recorded onto said writable record medium by using the detected information code, if the information code is recorded on said writable record medium, and (c) a recording device which records the record information, to which the control process has been applied, onto said writable record medium.

10. An information recording apparatus comprising:
(I) a record medium judging apparatus which judges whether a record medium is (i) a writable record medium on which an information code including at least identification information to individually identify the writable record medium is recorded, (ii) a writable record medium on which the information code is not recorded or (iii) a readable record medium on which record information is recorded in a read only manner, said record medium judging apparatus comprising:
  (a) a code judging apparatus comprising:
    a detecting device which optically detects information record medium recorded on said record medium to thereby output an output signal;
    a moving device which moves said detecting device onto a set area, which is an area on said writable record medium where the information code is supposed to be recorded; and
    a judging device which judges whether or not the information code is recorded on said writable record medium, in accordance with the output signal outputted from said detecting device moved on said set area,
  (b) a readable record medium judging device which judges whether or not said record medium is said readable record medium, on the basis of the output signal which is obtained by detecting the record information, and
  (c) a type judging device which judges that (i) said record medium is said writable record medium, on which the information code is recorded, if said code judging device judges that the information code is recorded, and (ii) said record medium is said writable record medium, on which the information code is not recorded, if said code judging device judges that the information code is not recorded, (II) a processing device which applies a control process, which is to control an operation of reproducing the record information from said writable record medium after recording, with respect to the record information to be recorded onto said writable record medium by using the detected information code, if said record medium is said writable record medium on which the information code is recorded, and (III) a recording device which records the record information, to which the control process has been applied, onto said writable record medium.

11. A record medium judging method for judging a type of a writable record medium on which record information can be written, whether the writable record medium is (i) a first writable record medium on which an information code including at least identification information to individually identify the writable record medium is recorded or (ii) a second writable record medium on which the information code is not recorded, said record medium judging method comprising:
- a moving process of moving a detecting device for optically detecting information recorded on said writable record medium to thereby output an output signal, onto a set area, which is an area on said writable record medium where the information code is supposed to be recorded;
- a code judging process of judging whether or not the information code is recorded on said writable record medium, in accordance with the output signal outputted from said detecting device moved on said set area; and
- a type judging process of judging whether said writable record medium is said first writable record medium or said second writable record medium based on the judging result by said code judging process.

12. The record medium judging method according to claim 11, wherein said code judging process comprises a binary-coding process of converting the output signal into a binary value and outputs a binary-coded signal, and said code judging process judges that the information code is recorded on said writable record medium if an edge interval, which is an interval of a switching timing between binary values of the outputted binary-coded signal, is within a preset interval.

13. The record medium judging method according to claim 11, wherein said code judging process comprises:
- a first judging process of judging whether or not an output level of the output signal is changed across a preset standard level;
- a binary-coding process of converting the output signal into a binary value and outputs a binary-coded signal; and
- a second judging process of judging whether or not an edge interval, which is an interval of a switching timing between binary values of the outputted binary-coded signal, is within an identification interval range preset so as to include the edge interval of the output signal corresponding to the record information, and said code judging process judges that the information code is recorded on said writable record medium if a result judged by said first judging process indicates that the output level is changed across the standard level and if a result judged by said second judging process does not indicate that the edge interval of the output signal corresponding to the information code is within the identification interval range.

14. The record medium judging method according to claim 13, wherein the edge interval of the output signal corresponding to the information code is within a range, which is equal to or greater than 3 times of a preset standard clock cycle and is equal to or less than 14 times of the standard clock cycle, and the identification interval range is longer than 2 times of the standard clock cycle and is shorter than 20 times of the standard clock cycle.

15. The record medium judging method according to claim 11, further comprising a decoding process of decoding the information code, wherein, even if said code judging process judges that the information code is not recorded on said writable record medium, if the information code is decoded by said decoding process, it is judged that the information code is recorded on said writable record medium.

16. A record medium judging method of judging whether a record medium is (i) a writable record medium on which an information code including at least identification information to individually identify the writable record medium is recorded, (ii) a writable record medium on which the information code is not recorded or (iii) a readable record medium on which record information is recorded in a read only manner, said record medium judging method comprising:

(a) a code judging method comprising:
- a moving process of moving a detecting device for optically detecting information recorded on said writable record medium to thereby output an output signal, onto a set area, which is an area on said writable record medium where the information code is supposed to be recorded;
- a code judging process of judging whether or not the information code is recorded on said writable record medium, in accordance with the output signal outputted from said detecting device moved on said set area, (b) a readable record medium judging process of judging whether or not said record medium is said readable record medium, on the basis of the output signal which is obtained by detecting the record information, and (c) a type judging process of judging that (i) said record medium is said writable record medium, on which the information code is recorded, if said code judging device judges that the information code is recorded, and that (ii) said record medium is said writable record medium, on which the information code is not recorded, if said code judging process judges that the information code is not recorded.

17. The record medium judging method according to claim 16, wherein said writable record medium includes wobbled information track, and said readable record medium judging process judges that said record medium is said readable record medium if the wobbled information track is not detected on said record medium.

18. The record medium judging method according to claim 16, wherein said writable record medium comprises a DVD-RW while said readable record medium comprises a DVD-ROM.

19. An information recording method comprising:

(a) a code judging method comprising:
- a moving process of moving a detecting device for optically detecting information recorded on said writable record medium to thereby output an output signal, onto a set area, which is an area on said writable record medium where the information code is supposed to be recorded;
- a judging process of judging whether or not the information code is recorded on said writable record medium, in accordance with the output signal outputted from said detecting device moved on said set area; and (b) a processing process of applying a control process, which is to control an operation of reproducing the record information from said writable record medium after recording, with respect to the record information to be recorded onto said writable record medium by using the detected information code, if the information code is recorded on said writable record medium, and (c) a recording process of recording the record information, to which the control process has been applied, onto said writable record medium.

20. An information recording method comprising:

(I) a record medium judging method of judging whether a record medium is (i) a writable record medium on which an information code including at least identification information to individually identify the writable record medium is recorded, (ii) a writable record medium on which the information code is not recorded or (iii) a readable record medium on which record information is recorded in a read only manner, said record medium judging method comprising:

(a) a code judging method comprising:

a moving process of moving a detecting device for optically detecting information recorded on said writable record medium to thereby output an output signal, onto a set area, which is an area on said writable record medium where the information code is supposed to be recorded;

a judging process of judging whether or not the information code is recorded on said writable record medium, in accordance with the output signal outputted from said detecting device moved on said set area; and (b) a readable record medium judging process of judging whether or not said record medium is said readable record medium, on the basis of the output signal which is obtained by detecting the record information, and (c) a type judging process of judging that (i) said record medium is said writable record medium, on which the information code is recorded, if said code judging process judges that the information code is recorded, and that (ii) said record medium is said writable record medium, on which the information code is not recorded, if said code judging process judges that the information code is not recorded, (II) a processing process of applying a control process, which is to control an operation of reproducing the record information from said writable record medium after recording, with respect to the record information to be recorded onto said writable record medium by using the detected information code, if said record medium is said writable record medium on which the information code is recorded, and (III) a recording process of recording the record information, to which the control process has been applied, onto said writable record medium.

* * * * *